US012630175B2

(12) United States Patent
Karmarkar et al.

(10) Patent No.: US 12,630,175 B2
(45) Date of Patent: May 19, 2026

(54) APPROACH TO OPERATION MISAPPLICATIONS FOR VEHICLES

(71) Applicant: QUALCOMM Incorporated, San Diego, CA (US)

(72) Inventors: Pavan Kishor Karmarkar, Mölndal (SE); Annika Larsson, Mölndal (SE); Marcus Ryman, Åby (SE)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 18/531,513

(22) Filed: Dec. 6, 2023

(65) Prior Publication Data

US 2025/0187621 A1     Jun. 12, 2025

(51) Int. Cl.
*B60W 50/12*          (2012.01)
*B60W 40/09*          (2012.01)
(52) U.S. Cl.
CPC ............ *B60W 50/12* (2013.01); *B60W 40/09* (2013.01); *B60W 2510/10* (2013.01); *B60W 2510/20* (2013.01)
(58) Field of Classification Search
CPC ................. B60W 50/12; B60W 40/09; B60W 2510/10; B60W 2510/20
USPC .......................................................... 701/36
See application file for complete search history.

(56) References Cited

U.S. PATENT DOCUMENTS

| | | | |
|---|---|---|---|
| 8,255,121 B2 | 8/2012 | Zagorski et al. | |
| 10,384,540 B2 | 8/2019 | Otake | |
| 11,225,258 B2 | 1/2022 | Matsunami | |
| 2010/0209881 A1 | 8/2010 | Lin et al. | |
| 2015/0012186 A1 | 1/2015 | Horseman | |

FOREIGN PATENT DOCUMENTS

| | | | | |
|---|---|---|---|---|
| DE | 102016203395 A1 | | 9/2017 | |
| DE | 102019206981 A1 | * | 11/2020 | .......... B60W 60/001 |
| DE | 102019132577 A1 | | 6/2021 | |

OTHER PUBLICATIONS

International Search Report and Written Opinion—PCT/US2024/057872—ISA/EPO—Mar. 4, 2025.

* cited by examiner

*Primary Examiner* — Isaac G Smith
(74) *Attorney, Agent, or Firm* — QUALCOMM Incorporated

(57)                    ABSTRACT

Disclosed are systems and techniques for driving assistance systems. For example, a computing device can determining an operation misapplication feature is applicable to a vehicle based on an operational design domain (ODD) context associated with the vehicle matching at least one of a plurality of predetermined ODDs. The computing device can determine, based on a comparison of characteristics of a driver of the vehicle to a plurality of predetermined driver state patterns, the driver is not ready to engage in a driving task associated with the vehicle. The computing device can determine the operation misapplication of the vehicle is a first type of operation misapplication. The computing device can actuate the vehicle to mitigate the operation misapplication based on determining the operation misapplication is the first type of operation misapplication.

20 Claims, 21 Drawing Sheets

| Environment attributes 810 | Environmental Objects 820 | Maps & Navigation 830 | Vehicle Sensors 840 |
|---|---|---|---|
| • Lanes<br>• Road Paint / Markings<br>• Pedestrian zones<br>• Sign Boards (Parking, Speed Limits,)<br>• Public/ Private Spaces<br>• Parking Stoppers<br>• Obstacles | • Parked Vehicles<br>• Absence of Environment Objects | • Identified Parking Zones<br>• Entry/Exit of Parking Zones<br>• Information on Road type & Attributes such as Speed Limits<br>• Entry/Exit into Private non-Mapped zones. | • Vehicle Motion |

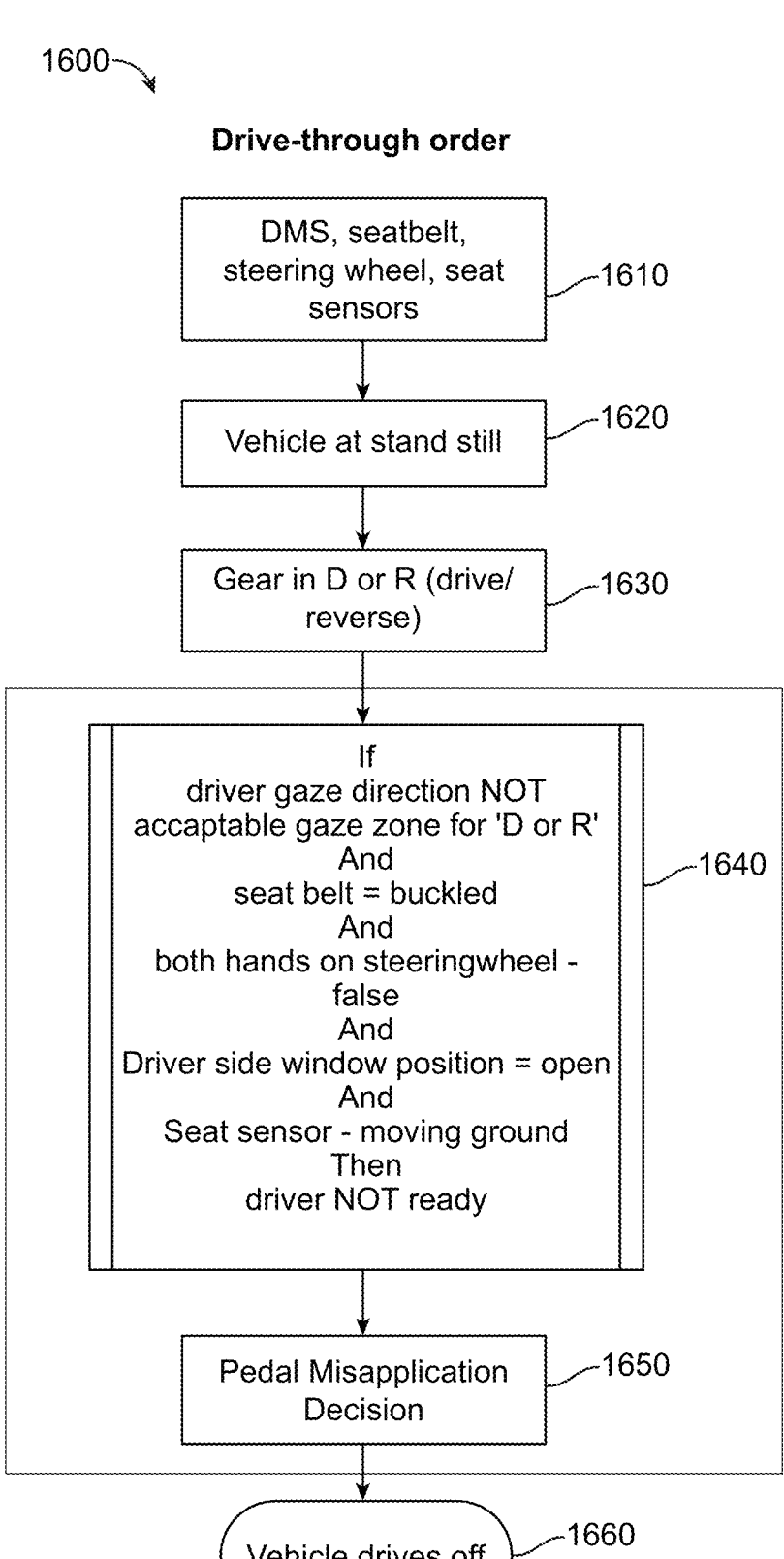

1600

Drive-through order

DMS, seatbelt, steering wheel, seat sensors — 1610

Vehicle at stand still — 1620

Gear in D or R (drive/reverse) — 1630

If
driver gaze direction NOT accaptable gaze zone for 'D or R'
And
seat belt = buckled
And
both hands on steeringwheel - false
And
Driver side window position = open
And
Seat sensor - moving ground
Then
driver NOT ready — 1640

Pedal Misapplication Decision — 1650

Vehicle drives off — 1660

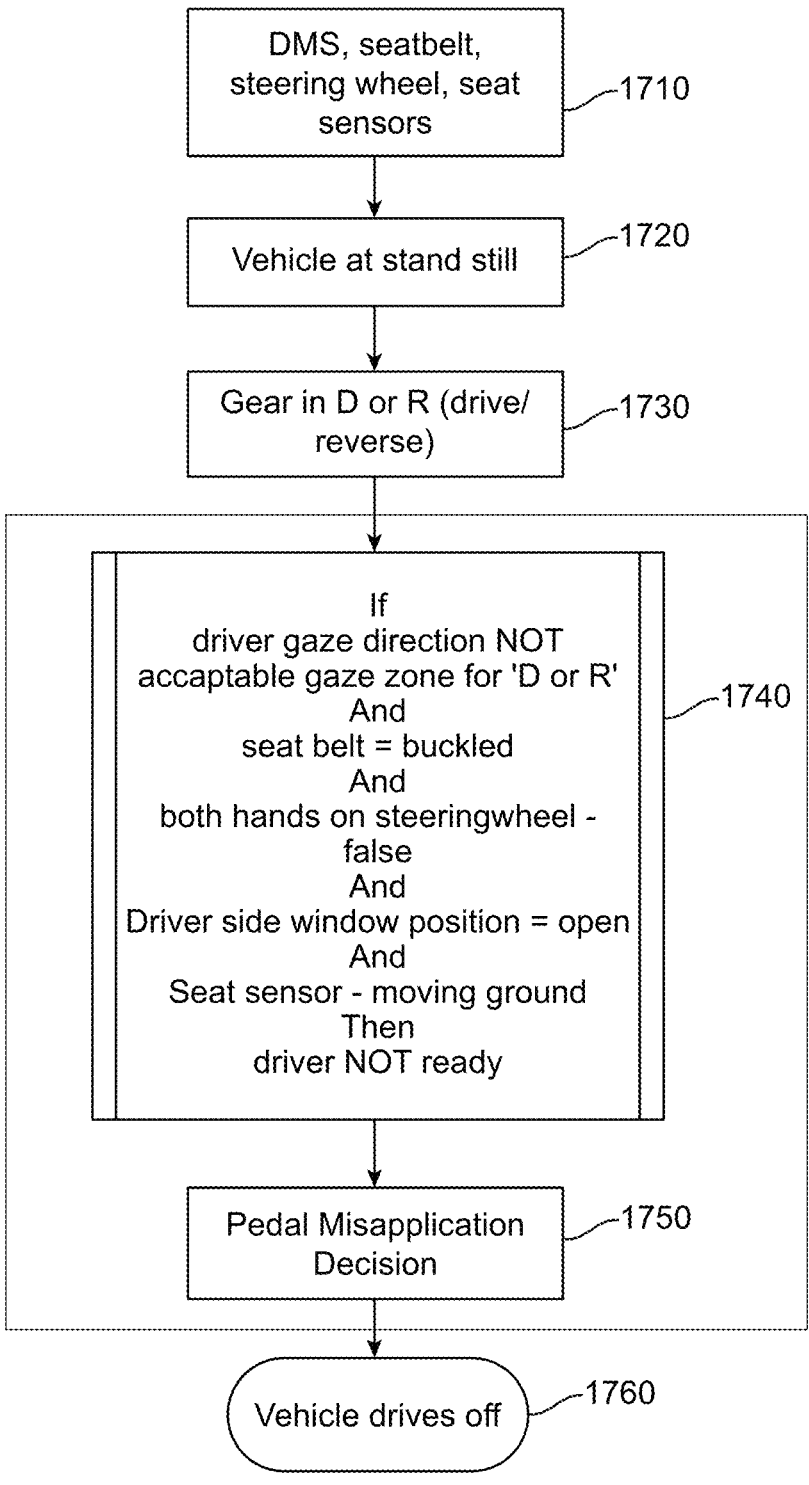

Distraction in the back-seat

DMS, seatbelt, steering wheel, seat sensors ——1710

Vehicle at stand still ——1720

Gear in D or R (drive/reverse) ——1730

If
driver gaze direction NOT
accaptable gaze zone for 'D or R'
And
seat belt = buckled
And
both hands on steeringwheel -
false
And
Driver side window position = open
And
Seat sensor - moving ground
Then
driver NOT ready ——1740

Pedal Misapplication Decision ——1750

Vehicle drives off ——1760

FIG. 17

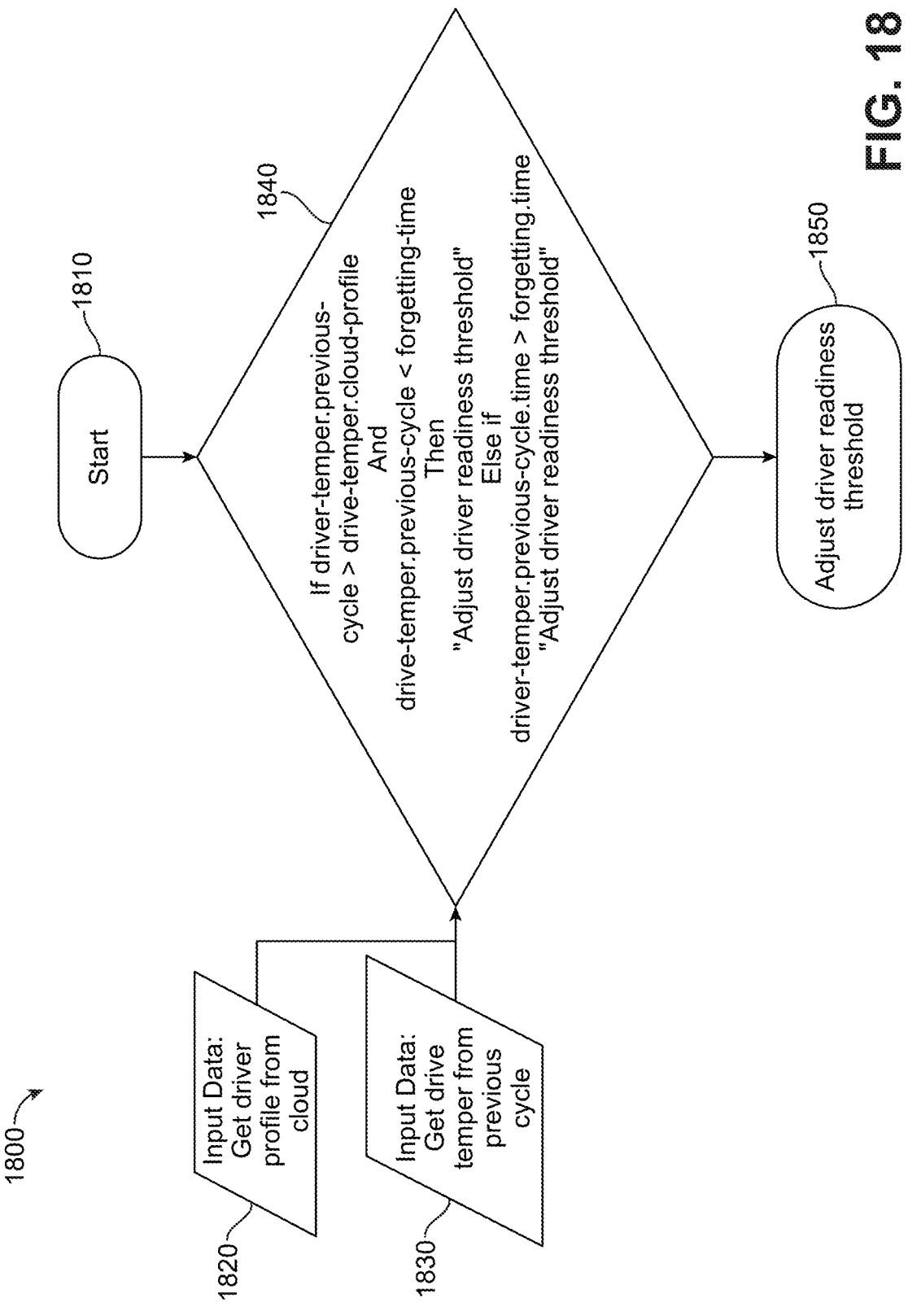

1800

Start
1810

1840

If driver-temper.previous-
cycle > drive-temper.cloud-profile
And
drive-temper.previous-cycle < forgetting-time
Then
"Adjust driver readiness threshold"
Else if
driver-temper.previous-cycle.time > forgetting.time
"Adjust driver readiness threshold"

Input Data:
Get driver
profile from
cloud
1820

Input Data:
Get drive
temper from
previous
cycle
1830

Adjust driver readiness
threshold
1850

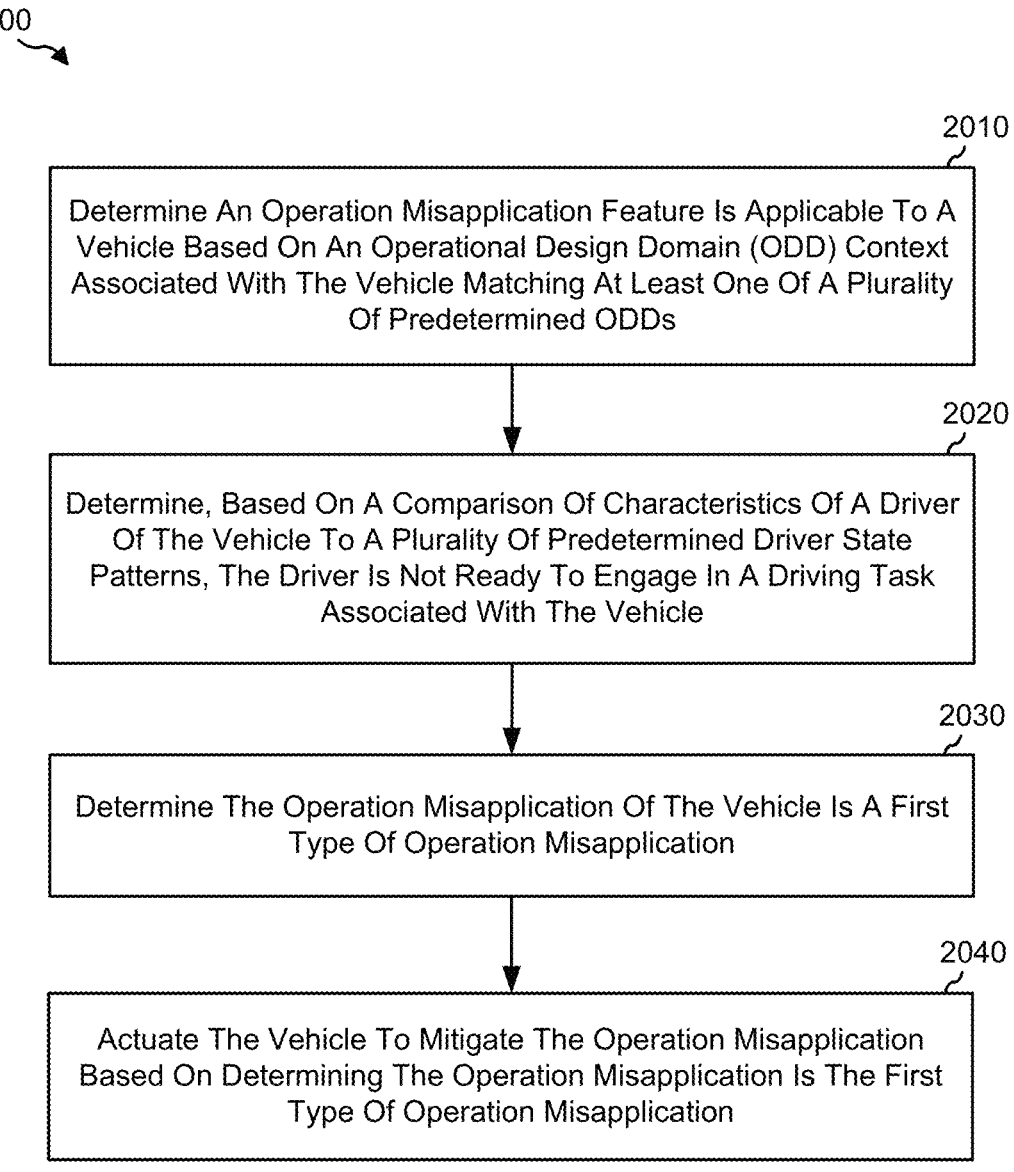

2010

Determine An Operation Misapplication Feature Is Applicable To A Vehicle Based On An Operational Design Domain (ODD) Context Associated With The Vehicle Matching At Least One Of A Plurality Of Predetermined ODDs

2020

Determine, Based On A Comparison Of Characteristics Of A Driver Of The Vehicle To A Plurality Of Predetermined Driver State Patterns, The Driver Is Not Ready To Engage In A Driving Task Associated With The Vehicle

2030

Determine The Operation Misapplication Of The Vehicle Is A First Type Of Operation Misapplication

2040

Actuate The Vehicle To Mitigate The Operation Misapplication Based On Determining The Operation Misapplication Is The First Type Of Operation Misapplication

FIG. 20

APPROACH TO OPERATION MISAPPLICATIONS FOR VEHICLES

FIELD

The present disclosure generally relates to driving assistance systems. For example, aspects of the present disclosure relate to an enhanced approach to operation misapplications (e.g., a pedal misapplication, a gear misapplication, or a steering misapplication) for vehicles.

BACKGROUND

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for an enhanced approach to operation misapplications (e.g., a pedal misapplication, a gear misapplication, or a steering misapplication) for vehicles. According to at least one example, an apparatus is provided for mitigating an operation misapplication of a vehicle. The apparatus includes at least one memory and at least one processor coupled to the at least one memory configured to: determine an operation misapplication feature is applicable to a vehicle based on an operational design domain (ODD) context associated with the vehicle matching at least one of a plurality of predetermined ODDs; determine, based on a comparison of characteristics of a driver of the vehicle to a plurality of predetermined driver state patterns, the driver is not ready to engage in a driving task associated with the vehicle; determine the operation misapplication of the vehicle is a first type of operation misapplication; and actuate the vehicle to mitigate the operation misapplication based on determining the operation misapplication is the first type of operation misapplication.

In another example, a method is provided for mitigating an operation misapplication of a vehicle. The method includes: determining an operation misapplication feature is applicable to a vehicle based on an operational design domain (ODD) context associated with the vehicle matching at least one of a plurality of predetermined ODDs; determining, based on a comparison of characteristics of a driver of the vehicle to a plurality of predetermined driver state patterns, the driver is not ready to engage in a driving task associated with the vehicle; determining the operation misapplication of the vehicle is a first type of operation misapplication; and actuating the vehicle to mitigate the operation misapplication based on determining the operation misapplication is the first type of operation misapplication.

In another example, a non-transitory computer-readable medium is provided having stored thereon instructions that, when executed by one or more processors, cause the one or more processors to: determine an operation misapplication feature is applicable to a vehicle based on an operational design domain (ODD) context associated with the vehicle matching at least one of a plurality of predetermined ODDs; determine, based on a comparison of characteristics of a driver of the vehicle to a plurality of predetermined driver state patterns, the driver is not ready to engage in a driving task associated with the vehicle; determine the operation misapplication of the vehicle is a first type of operation misapplication; and actuate the vehicle to mitigate the operation misapplication based on determining the operation misapplication is the first type of operation misapplication.

In another example, an apparatus is provided that includes: means for determining an operation misapplication feature is applicable to a vehicle based on an operational design domain (ODD) context associated with the vehicle matching at least one of a plurality of predetermined ODDs; means for determining, based on a comparison of characteristics of a driver of the vehicle to a plurality of predetermined driver state patterns, the driver is not ready to engage in a driving task associated with the vehicle; means for determining the operation misapplication of the vehicle is a first type of operation misapplication; and means for actuating the vehicle to mitigate the operation misapplication based on determining the operation misapplication is the first type of operation misapplication.

Aspects generally include a method, apparatus, system, computer program product, non-transitory computer-readable medium, user device, user equipment, wireless communication device, and/or processing system as substantially described with reference to and as illustrated by the drawings and specification.

In some aspects, one or more of the apparatuses described herein is, is part of, or includes a vehicle (e.g., an automobile, truck, etc., or a component or system of an automobile, truck, etc.), a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a robotics device, or other device. In some aspects, the apparatus includes radio detection and ranging (radar) for capturing radio frequency (RF) signals. In some aspects, the apparatus includes one or more light detection and ranging (LiDAR) sensors, radar sensors, or other light-based sensors for capturing light-based (e.g., optical frequency) signals. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following figures:

FIG. 8 is a table illustrating examples of data for determining an operational design domain (ODD) context of a vehicle, in accordance with some aspects of the present disclosure.

FIG. 16 is a flow chart illustrating an example of a process for determining whether a vehicle is in a drive-through lane for receiving an order, in accordance with some aspects of the present disclosure.

FIG. 17 is a flow chart illustrating an example of a process for determining whether there is a distraction to the driver in a backseat of a vehicle, in accordance with some aspects of the present disclosure.

FIG. 18 is a flow chart illustrating an example of a process for determining driver readiness for driving the vehicle based on driver profile information, in accordance with some aspects of the present disclosure.

FIG. 20 is a flow chart illustrating an example of a process for mitigating operation misapplications of a vehicle, according to some aspects of the present disclosure.

DETAILED DESCRIPTION

Figure 1:
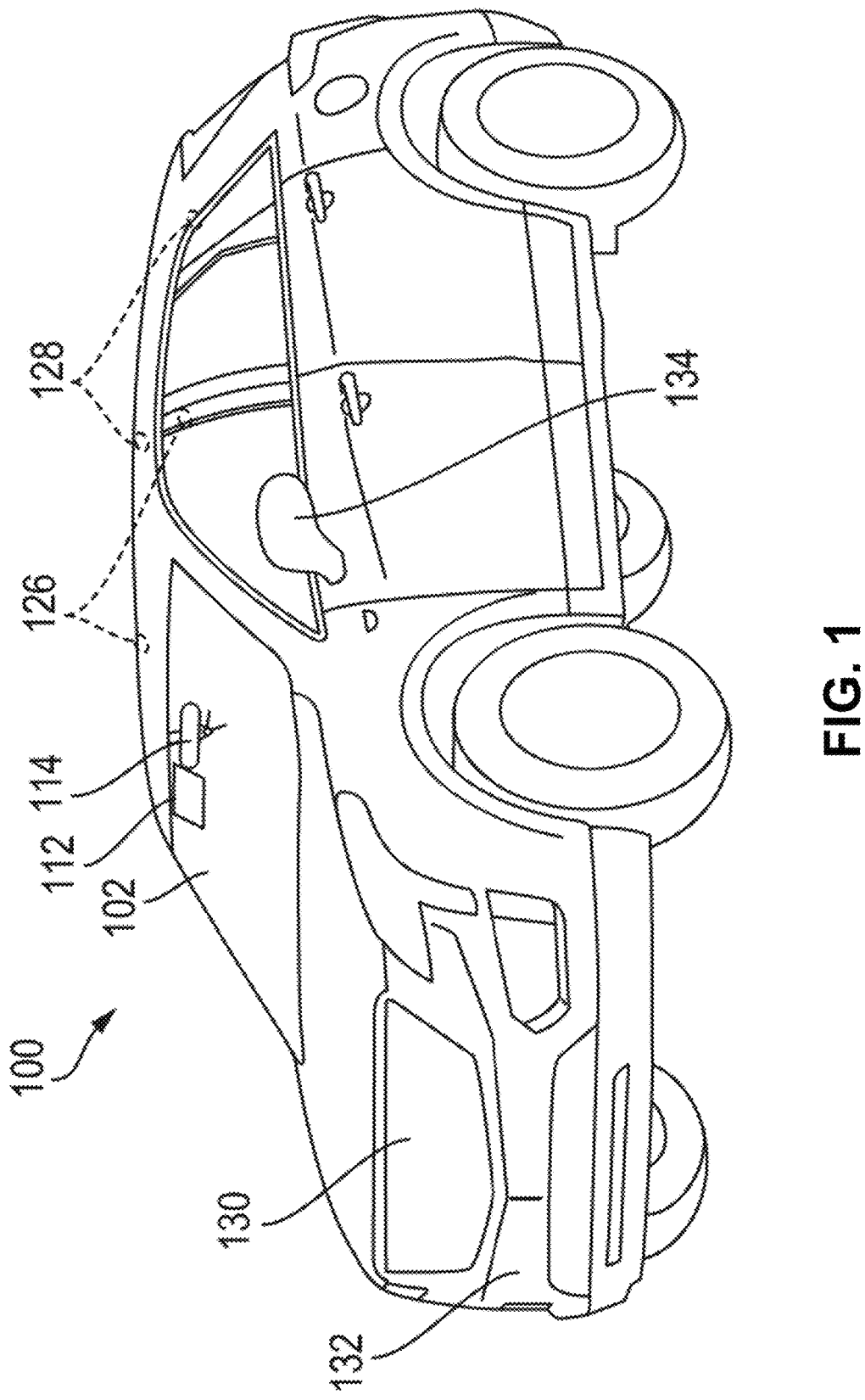
FIG. 1 is diagram illustrating a perspective view of an example of a motor vehicle with a driver monitoring system, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Operation misapplication of a vehicle by a driver of the vehicle is a critical factor in many traffic accidents. Operation misapplication of a vehicle can include a pedal misapplication such as the driver of the vehicle incorrectly pressing an acceleration pedal (e.g., a gas pedal in a gasoline-powered vehicle, an electronic pedal (or e-pedal) in an electric vehicle, etc.) instead of the brake pedal, a gear misapplication such as the driver incorrectly shifting the transmission of the vehicle to reverse instead of to drive, and/or a steering misapplication such as the driver incorrectly steering the steering wheel of the vehicle to the left instead of to the right.

A basic pedal misapplication feature (e.g., to mitigate a pedal misapplication of a vehicle by a driver of the vehicle) was introduced. This basic pedal misapplication feature can be enabled within a vehicle to limit the amount of acceleration of the vehicle to mitigate a pedal misapplication by the driver of the vehicle, based on sensor data and other traffic information associated with object detection within an environment of the vehicle. However, the current implementation of this basic pedal misapplication feature is not robust and, as such, has a limited availability.

As such, improved systems and techniques to provide an enhanced approach to an operation (e.g., pedal, gear, and/or steering) misapplication of a vehicle can be beneficial.

In one or more aspects of the present disclosure, systems, apparatuses, methods (also referred to as processes), and computer-readable media (collectively referred to herein as "systems and techniques") are described herein that provide an enhanced approach to an operation (e.g., pedal, gear, or steering) misapplication of a vehicle. In some cases, a system configured to implement the techniques described herein can be, or can be part of, a driving assistance system (e.g., an advanced driver-assistance system (ADAS)) of a vehicle. In one or more examples, the systems and techniques apply different misapplication mitigation measures (e.g., acceleration suppression, brake application, and/or drive control, such as steering control, engine control in a gasoline-powered vehicle, and/or battery control in an electric vehicle) depending upon operational design domain (ODD) context (e.g., whether an operation misapplication feature for mitigating the operation misapplication is applicable to the vehicle), based on external sensing, mapping, vehicle sensing, and/or driver monitoring. In one or more examples, acceleration suppression, brake activation, and/or drive control can be applied to the vehicle when a threat of collision of the vehicle is determined to be imminent (e.g., a likelihood of the operation misapplication of the vehicle is determined to be high, which for example can indicate a severity of the operation misapplication of the vehicle is a high severity). If the threat of collision of the vehicle is determined to be not imminent (e.g., the likelihood of the operation misapplication of the vehicle is determined to be low, which for example can indicate a severity of the operation misapplication of the vehicle is a low severity), a warning (e.g., a visual warning, an audio warning, and/or a haptic warning) may be displayed and/or presented to the driver of the vehicle via a human machine interface (HMI).

In one or more aspects, during operation for mitigating an operation (e.g., pedal, gear, or steering) misapplication of a vehicle, the vehicle can obtain sensor data associated with the vehicle and an environment of the vehicle. In one or more examples, the sensor data may include first traffic sensor data, second traffic sensor data, additional environment information, vehicle sensor data, direct driver sensor data, and/or indirect driver sensor data.

In one or more examples, one or more traffic sensors (e.g., forward cameras, surrounding cameras, radar sensors, ultrasonic sensors (UCS), light detection and ranging (LiDAR) sensors, and/or infrared sensors) of the vehicle can sense an environment of the vehicle to obtain first traffic sensor data. The vehicle can obtain, from one or more other vehicles via vehicle communications (e.g., vehicle-to-vehicle (V2V) and/or vehicle-to-everything (V2X) communications), second traffic sensor data associated with the environment of the vehicle. The vehicle can also obtain additional environment information (e.g., map information, navigation information, localization information associated with the vehicle). One or more vehicle sensors (e.g., vehicle motion sensors, such as inertial measurement units (IMUs) and vehicle body controls) of the vehicle can sense motion of the vehicle to obtain vehicle sensor data. One or more direct driver sensors (e.g., driver monitoring sensors, such as cameras and radar) within a cabin (e.g., passenger compartment) of the vehicle can sense a driver of the vehicle to obtain direct driver sensor data. One or more indirect driver sensors (e.g., seat belt sensors to detect seat belt status of the driver and/or passengers; occupancy sensors to detect occupancy status of the driver and/or passengers; vehicle controls, such as steering, pedals, and/or gear shifting; and/or HMI controls, such as switches and/or infotainment; vehicle body controls, such as operation of windows, wipers, and/or door lock/unlock) of the vehicle can sense the driver of the vehicle to obtain indirect driver sensor data.

In one or more examples, one or more processors of the vehicle can determine an operational design domain (ODD) context of the vehicle based on the first traffic sensor data, the second traffic sensor data, the additional environment information, and/or the vehicle sensor data. The one or more processors of the vehicle can compare the ODD context of the vehicle to a plurality of predetermined risky ODDs. The one or more processors of the vehicle can determine an operation misapplication feature is applicable to the vehicle based on the ODD context of the vehicle matching at least one of the plurality of predetermined risky ODDs.

In some examples, the one or more processors of the vehicle can determine characteristics of the driver of the vehicle based on the first traffic sensor data, the second traffic sensor data, the vehicle sensor data, the direct driver sensor data, and/or the indirect driver sensor data. The one or more processors of the vehicle can obtain (e.g., from a cloud server and/or a database within the vehicle) driver profile information, which may include a typical behavior pattern of the driver to drive the vehicle, a state (e.g., temper, fatigue, distraction, etc.) of the driver, and/or a gaze movement of the driver. The one or more processors of the vehicle can determine the characteristics of the driver of the vehicle further based on the driver profile information. The one or more processors of the vehicle can compare the characteristics of the driver to a plurality of predetermined driver state patterns. The one or more processors of the vehicle can determine that the driver is not in a state to engage in a driving task associated with the vehicle (e.g., driver readiness is not present, such as the driver is not ready to engage in the driving task associated with the vehicle) based on the characteristics of the driver not matching at least one of the plurality of predetermined driver state patterns.

In one or more examples, the one or more processors of the vehicle can determine a likelihood of the operation misapplication of the vehicle based on the first traffic sensor data, the second traffic sensor data, and/or vehicle sensor data. The one or more processors of the vehicle can compare the likelihood of the operation misapplication of the vehicle to a threshold likelihood for the operation misapplication of the vehicle. The one or more processors of the vehicle can determine the likelihood of the operation misapplication of the vehicle is a high likelihood (e.g., a threat of collision of the vehicle is imminent) based on the determination of the likelihood of the operation misapplication of the vehicle is greater than or equal to the threshold likelihood. The one or more processors of the vehicle can perform an actuation (e.g., an acceleration pedal suppression, applying braking, controlling engine, steering control, driving control, any combination thereof, and/or other actuation) of the vehicle to mitigate the operation misapplication based on the determination of the likelihood of the operation misapplication of the vehicle is a high likelihood, the determination of the operation misapplication feature is applicable to the vehicle, and the determination of the driver is not in a state to engage in a driving task associated with the vehicle.

In some examples, the one or more processors of the vehicle can determine the severity of the operation misapplication of the vehicle is a low likelihood (e.g., the threat of collision of the vehicle is not imminent) based on the determination of the likelihood of the operation misapplication of the vehicle is less than the threshold likelihood. The one or more processors of the vehicle can activate a warning (e.g., a forward collision warning (FCW), such as a visual warning, an audio warning, and/or a haptic warning) based on the determining of the likelihood of the operation misapplication of the vehicle is a low likelihood, the determination of the operation misapplication feature is applicable to the vehicle, and the determination of the driver is not in a state to engage in a driving task associated with the vehicle.

Additional aspects of the present disclosure are described in more detail below.

FIG. 1 is a perspective view of a motor vehicle with a driver monitoring system according to aspects of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or in a forward direction. In some aspects, an additional camera may be located at the rear of the vehicle 100 and oriented such that the field of view of the additional camera captures a scene behind the vehicle 100 in the direction that the vehicle 100 is moving when in reverse mode or in a reverse direction. Although aspects of the disclosure may be described with reference to a "front-facing" camera, referring to camera 112, aspects of the disclosure may be applied similarly to a "rear-facing" camera facing in the reverse direction of the vehicle 100. Thus, the benefits obtained while the vehicle 100 is traveling in a forward direction may likewise be obtained while the vehicle 100 is traveling in a reverse direction.

Further, although aspects of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle, with sufficient detail to discern a head rotation (e.g., a head down position) and/or a gaze direction (e.g., eye viewing direction) of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
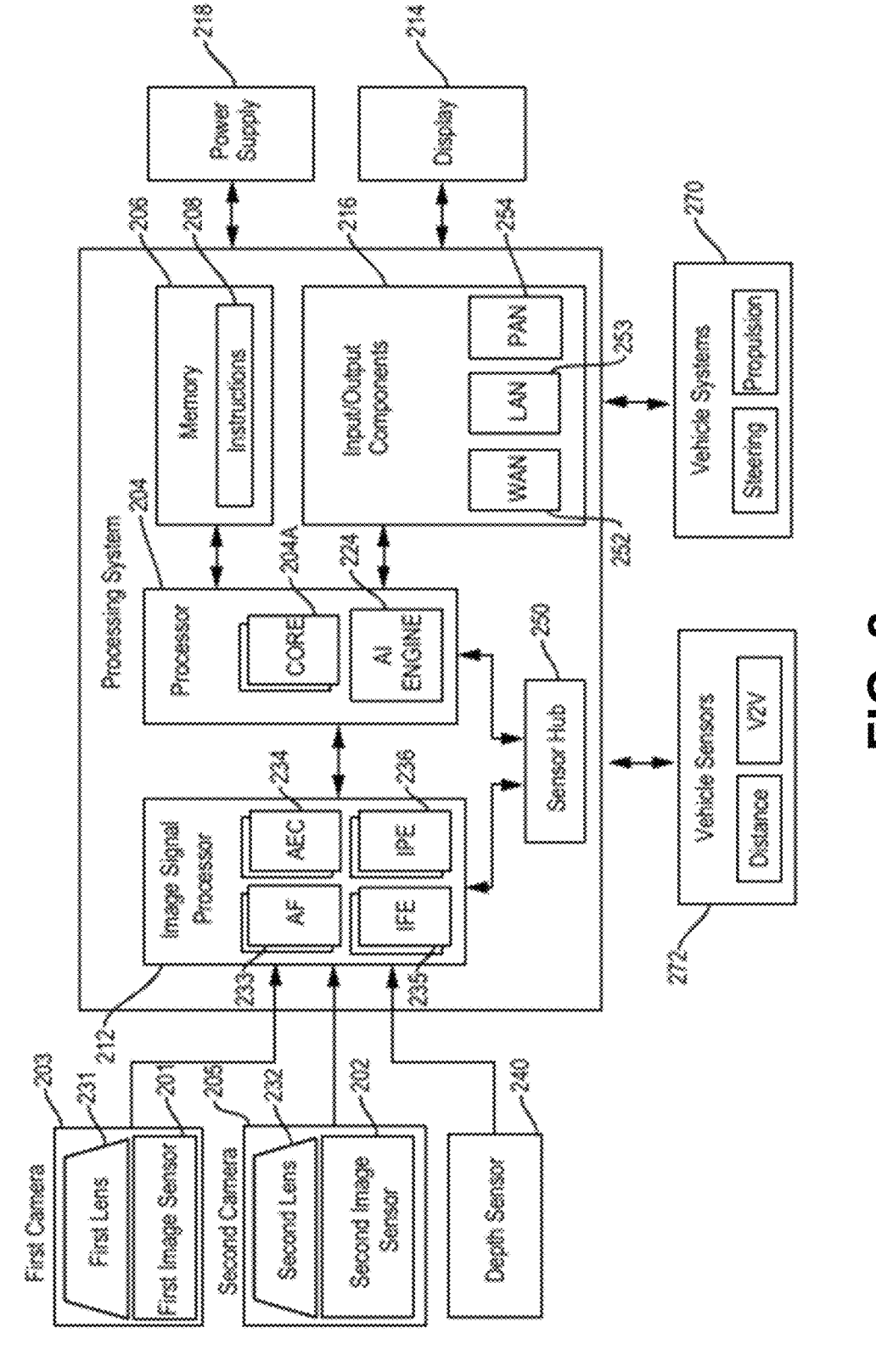
FIG. 2 is a block diagram illustrating an example of an image processing configuration for a vehicle, in accordance with some aspects of the present disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The device 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one aspect, a local bus connection couples the image signal processor 212 to image sensors 201 and 202 of a first camera 203, which may correspond to camera 112 of FIG. 1, and second camera 205, which may correspond to camera 114 of FIG. 1, respectively. In another aspect, a wire interface may couple the image signal processor 212 to an external image sensor. In a further aspect, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some aspects, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some aspects, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some aspects, the vehicle 100 includes a system on chip (SoC) that incorporates the image signal processor 212, the processor 204, the sensor hub 250, the memory 206, and input/output components 216 into a single package.

In some aspects, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some aspects, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display 114 in the cabin of the vehicle 100.

In some aspects, the processor 204 may include ICs or other hardware (e.g., an artificial intelligence (AI) engine 224) in addition to the ability to execute software to cause the vehicle 100 to perform a number of functions or operations, such as the operations described herein. In some other aspects, the vehicle 100 does not include the processor 204, such as when all of the described functionality is configured in the image signal processor 212.

In some aspects, the display 214 may include one or more suitable displays or screens allowing for user interaction and/or to present items to the user, such as a preview of the image frames being captured by the image sensors 201 and 202. In some aspects, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some aspects involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

As previously mentioned, operation misapplication of a vehicle by a driver of the vehicle is a critical factor in many traffic accidents. Operation misapplication of a vehicle may include a pedal misapplication such as the driver of the vehicle incorrectly pressing an acceleration pedal (e.g., a gas pedal in a gasoline-powered vehicle, an electronic pedal (or e-pedal) in an electric vehicle, etc.) instead of the brake pedal, a gear misapplication such as the driver incorrectly shifting the transmission of the vehicle to reverse instead of to drive, and/or a steering misapplication such as the driver incorrectly steering the steering wheel of the vehicle to the left instead of to the right.

A basic pedal misapplication feature (e.g., to mitigate a pedal misapplication of a vehicle by a driver of the vehicle) was introduced. This basic pedal misapplication feature may be enabled within a vehicle to limit the amount of acceleration of the vehicle to mitigate a pedal misapplication by the driver of the vehicle, based on sensor data and other traffic information associated with object detection within an environment of the vehicle. However, the current implementation of this basic pedal misapplication feature is not robust and, thus, has a limited availability. Therefore, improved systems and techniques to provide an enhanced approach to an operation (e.g., pedal, gear, and/or steering) misapplication of a vehicle can be useful.

In one or more aspects, systems and techniques provide an enhanced approach to an operation (e.g., pedal, gear, or steering) misapplication of a vehicle. In one or more examples, the systems and techniques can apply different misapplication mitigation measures (e.g., acceleration suppression, brake application, and/or drive control, such as steering control, engine control in a gasoline-powered vehicle, and/or battery control in an electric vehicle) depending upon ODD context (e.g., whether an operation misapplication feature for mitigating the operation misapplication is applicable to the vehicle), based on external sensing, mapping, vehicle sensing, and/or driver monitoring. In some examples, acceleration suppression, brake activation, and/or drive control may be applied to the vehicle when a threat of collision of the vehicle is determined to be imminent (e.g., a likelihood of the operation misapplication of the vehicle is determined to be high). If the threat of collision of the vehicle is determined to be not imminent (e.g., the likelihood of the operation misapplication of the vehicle is determined to be low), a warning (e.g., a visual warning, an audio warning, and/or a haptic warning) can be displayed and/or presented to the driver of the vehicle via an HMI.

Figure 3:
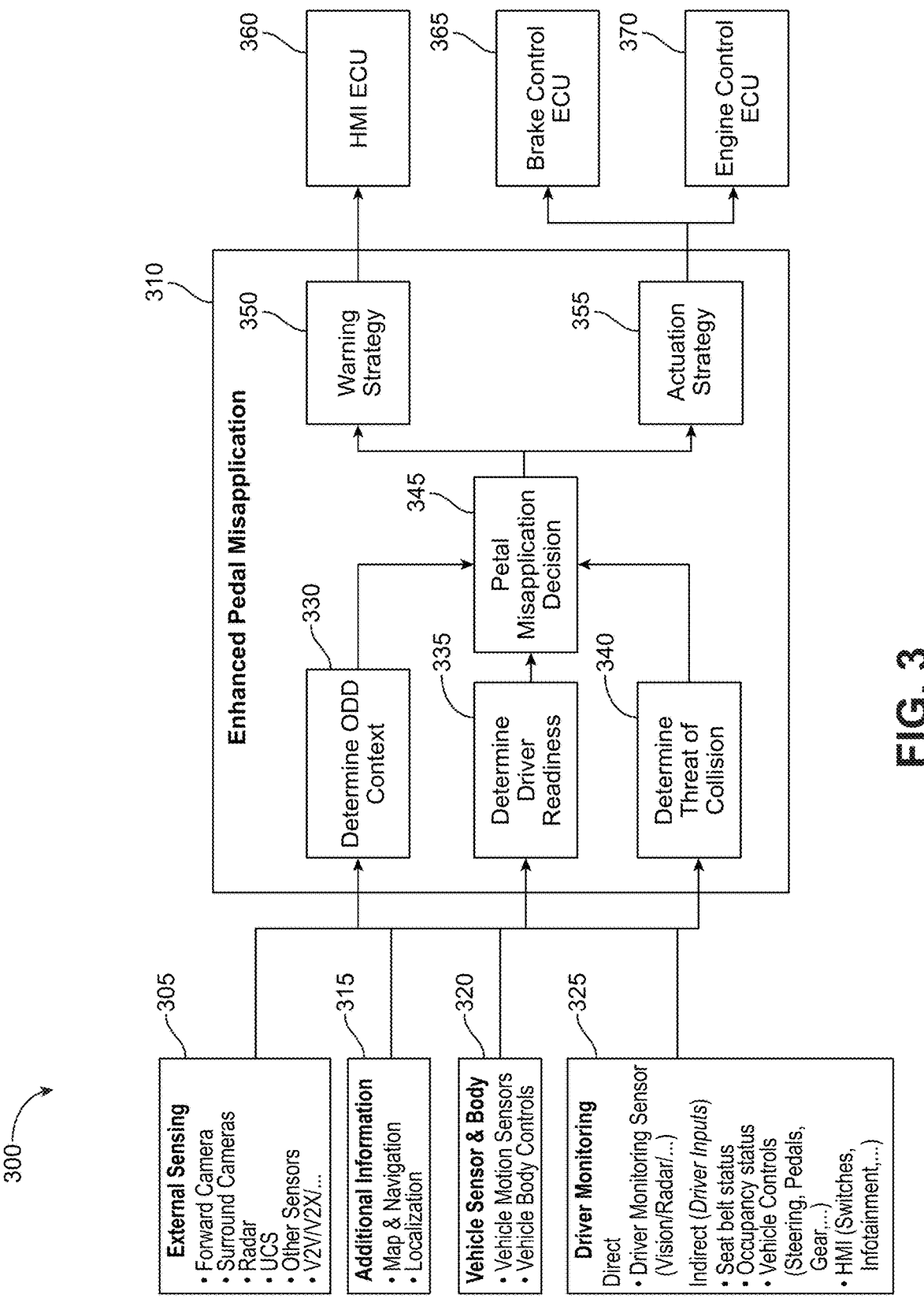
FIG. 3 is a block diagram illustrating an example of a process for determining and mitigating an operation misapplication, in accordance with some aspects of the present disclosure.

FIG. 3 shows an example of a process for an enhanced approach to an operation (e.g., pedal, gear, or steering) misapplication of a vehicle. In particular, FIG. 3 is a block diagram illustrating an example of a process 300 for determining and mitigating an operation (e.g., pedal) misapplication. In FIG. 3, an enhanced operation (e.g., pedal) misapplication process 310 is shown to determine an operation misapplication (e.g., a pedal misapplication) and a mitigation strategy (e.g., a warning strategy 350 or an actuation strategy 355) to perform to mitigate the detected operation misapplication. The process 300 of FIG. 3 shows an example of determining and mitigating a pedal misapplication. In one or more examples, other operation misapplications (e.g., a gear misapplication or a steering misapplication) other than a pedal misapplication (as shown in the example of FIG. 3) may be detected and mitigated by the process of 300.

During operation for the process 300 for determining and mitigating an operation (e.g., pedal, gear, or steering) misapplication of a vehicle (e.g., vehicle 100 of FIG. 1), the vehicle may obtain sensor data associated with the vehicle and an environment of the vehicle. In one or more examples, the sensor data can include first traffic sensor data, second traffic sensor data, additional environment information, vehicle sensor data, direct driver sensor data, and/or indirect driver sensor data.

In one or more examples, one or more traffic sensors (e.g., sensors associated with external sensing 305, for example including forward cameras, surrounding cameras, radar sensors, UCS, LiDAR sensors, and/or infrared sensors) of the vehicle can sense an environment of the vehicle to obtain first traffic sensor data. The vehicle can obtain, from one or more other vehicles via vehicle communications (e.g., V2V and/or V2X communications), second traffic sensor data (e.g., data from external sensing 305) associated with the environment of the vehicle. The vehicle may also obtain additional environment information (e.g., additional information 315, which may include map information, navigation information, localization information associated with the vehicle). One or more vehicle sensors (e.g., vehicle sensor and body 320 sensors, which may include vehicle motion sensors, such as IMUs and vehicle body controls) of the vehicle can sense motion of the vehicle to obtain vehicle sensor data. One or more direct driver sensors (e.g., driver monitoring 325 sensors, such as cameras and radar) within a cabin (e.g., passenger compartment) of the vehicle can sense a driver of the vehicle to obtain direct driver sensor data. One or more indirect driver sensors (e.g., driver monitoring 325 sensors, such as seat belt sensors to detect seat belt status of the driver and/or passengers; occupancy sensors to detect occupancy status of the driver and/or passengers; vehicle controls, such as steering, pedals, and/or gear shifting; and/or HMI controls, such as switches and/or infotainment) of the vehicle can sense the driver of the vehicle to obtain indirect driver sensor data.

During the enhanced operation (e.g., pedal) misapplication process 310, at block 330 (e.g., determine ODD context), one or more processors of the vehicle can determine an ODD context of the vehicle based on the first traffic sensor data (e.g., obtained from the external sensing 305), the second traffic sensor data (e.g., obtained from the external sensing 305), the additional environment information (e.g., the additional information 315), and/or the vehicle sensor data (e.g., obtained from the vehicle sensor and body 320 sensors). The one or more processors of the vehicle can compare the ODD context of the vehicle to a plurality of predetermined risky ODDs. The one or more processors of the vehicle can determine an operation misapplication feature is applicable to the vehicle based on the ODD context of the vehicle matching at least one of the plurality of predetermined risky ODDs. Conversely, the one or more processors of the vehicle can determine an operation misapplication feature is not applicable to the vehicle based on the ODD context of the vehicle not matching at least one of the plurality of predetermined risky ODDs. The output of block 330 (e.g., determine ODD context) can be inputted into block 345 for the operation (e.g., pedal, gear, or steering) misapplication decision.

At block 335 (e.g., determine drive readiness), the one or more processors of the vehicle can determine characteristics of the driver of the vehicle based on the first traffic sensor data (e.g., obtained from the external sensing 305), the second traffic sensor data (e.g., obtained from the external sensing 305), the vehicle sensor data (e.g., obtained from the vehicle sensor and body 320 sensors), the direct driver sensor data (e.g., obtained from driver monitoring 325), and/or the indirect driver sensor data (e.g., obtained from driver monitoring 325). The one or more processors of the vehicle can obtain (e.g., from a cloud server and/or a database within the vehicle) driver profile information, which may include a typical behavior pattern of the driver to drive the vehicle, a state (e.g., temper, fatigue, distraction, etc.) of the driver, and/or a gaze movement of the driver. The one or more processors of the vehicle can determine the characteristics of the driver of the vehicle further based on the driver profile information. The one or more processors of the vehicle can compare the characteristics of the driver to a plurality of predetermined driver state patterns. The one or more processors of the vehicle can determine that the driver is in a state to engage in a driving task associated with the vehicle (e.g., driver readiness is present, such as the driver is ready to engage in the driving task associated with the vehicle) based on the characteristics of the driver matching at least one of the plurality of predetermined driver state patterns. Conversely, the one or more processors of the vehicle can determine that the driver is not in a state to engage in a driving task associated with the vehicle (e.g., driver readiness is not present, such as the driver is not ready to engage in the driving task associated with the vehicle) based on the characteristics of the driver not matching at least one of the plurality of predetermined driver state patterns. The output of block 335 (e.g., determine driver readiness) can be inputted into block 345 for the operation (e.g., pedal, gear, or steering) misapplication decision.

At block 340 (e.g., determine threat of collision), the one or more processors of the vehicle can determine a likelihood of the operation misapplication of the vehicle based on the first traffic sensor data (e.g., obtained from the external sensing 305), the second traffic sensor data (e.g., obtained from the external sensing 305), and/or vehicle sensor data (e.g., obtained from the vehicle sensor and body 320 sensors). The one or more processors of the vehicle can compare the likelihood of the operation misapplication of the vehicle to a threshold likelihood for the operation misapplication of the vehicle. The one or more processors of the vehicle can determine the likelihood of the operation misapplication of the vehicle is a high likelihood (e.g., a threat of collision of the vehicle is imminent) based on the determination of the likelihood of the operation misapplication of the vehicle is greater than or equal to the threshold likelihood. Conversely, the one or more processors of the vehicle can determine the likelihood of the operation misapplication of the vehicle is a low likelihood (e.g., the threat of collision of the vehicle is not imminent) based on the determination of the likelihood of the operation misapplication of the vehicle is less than the threshold likelihood. The output of block 340 (e.g., determine threat of collision) can be inputted into block 345 for the operation (e.g., pedal, gear, or steering) misapplication decision.

At block 345, the one or more processors of the vehicle can determine an operation (e.g., pedal, gear or steering) misapplication decision (e.g., whether an operation misapplication occurred) based on the inputs from block 330 (e.g., determine ODD context), block 335 (e.g., determine driver readiness), and/or block 340 (e.g., determine threat of collision). The one or more processors can determine a strategy (e.g., a warning strategy 350 or a actuation strategy 355) to use to mitigate a detected operation (e.g., pedal, gear, or steering) misapplication.

In one or more examples, at block 350 (e.g., warning strategy), the one or more processors of the vehicle can determine to activate a warning (e.g., an FCW, such as a visual warning, an audio warning, and/or a haptic warning) based on determining the likelihood of the operation misapplication of the vehicle is a low likelihood, the determination of the operation misapplication feature is applicable to the vehicle, and the determination of the driver is not in a state to engage in a driving task associated with the vehicle. At block 360 (e.g., HMI electronic control unit (ECU) 360), the warning can be activated by the HMI ECU.

In some examples, at block 355 (e.g., actuation strategy), the one or more processors of the vehicle can determine to perform an actuation (e.g., an acceleration suppression, applying braking, and/or controlling an engine of the vehicle) of the vehicle to mitigate the operation misapplication based on the determination of the likelihood of the operation misapplication of the vehicle is a high likelihood, the determination of the operation misapplication feature is applicable to the vehicle, and the determination of the driver is not in a state to engage in a driving task associated with the vehicle. At block 365 (e.g., brake control ECU), braking can be applied by the brake control ECU. At block 370 (e.g., engine control ECU), the engine can be controlled by the engine control ECU.

Figure 4:
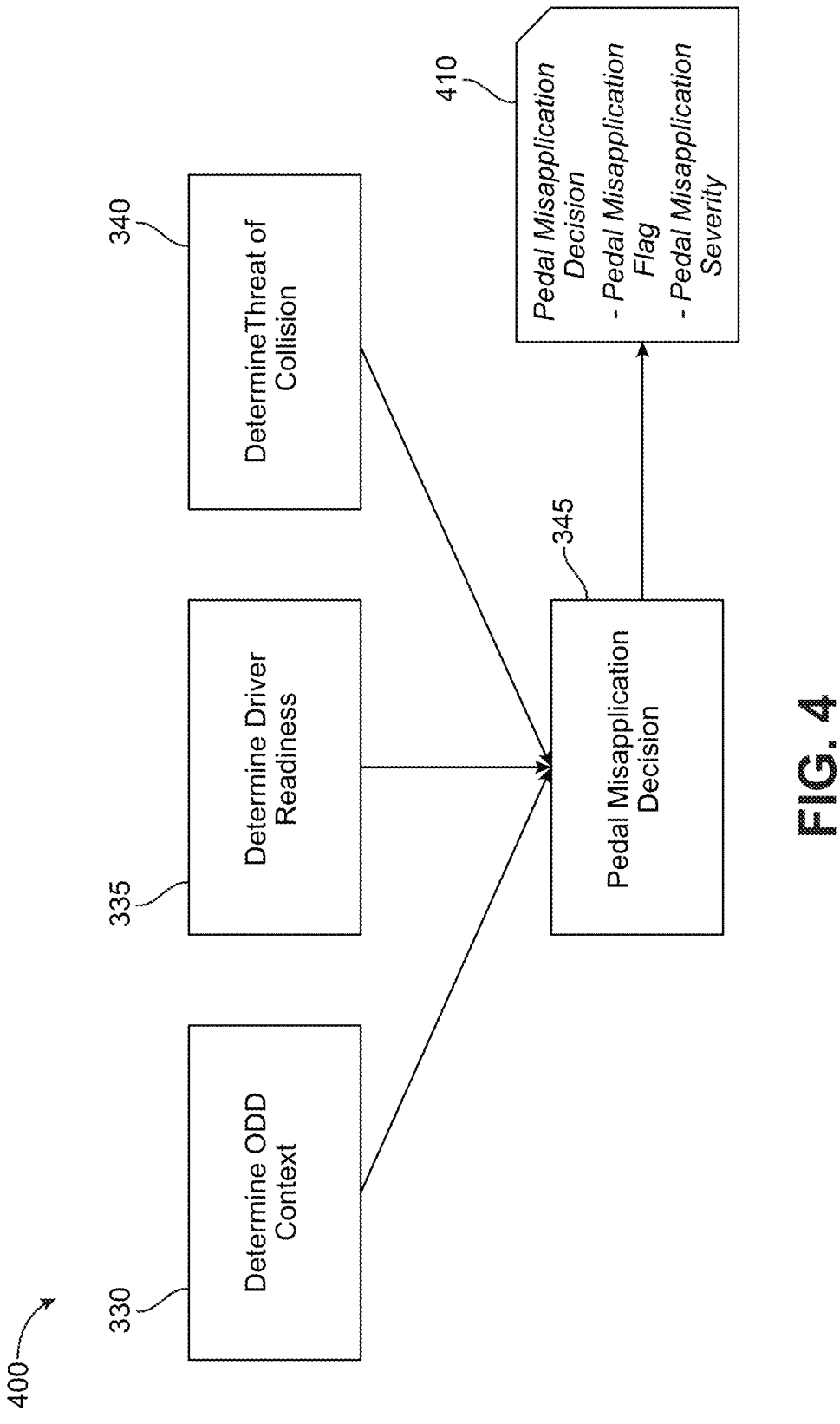
FIG. 4 is a block diagram illustrating an example of a process for determining an operation misapplication, in accordance with some aspects of the present disclosure.

FIG. 4 is a block diagram illustrating an example of a process 400 for determining an operation (e.g., pedal, gear, or steering) misapplication. In FIG. 4, the outputs from block 330 (e.g., determine ODD context), block 335 (e.g., determine driver readiness), and block 340 (e.g., determine threat of collision) can be input into the block 345 (e.g., operation, such as pedal, misapplication decision). In one or more examples, the processes (e.g., algorithms) for the blocks 330, 335, and 340 can be run concurrently (e.g., in parallel, such as at the same time) and/or serially (e.g., executed one after the other). The block 345 can use these inputs to determine whether an operation (e.g., pedal, gear, or steering) misapplication occurred and, if so, the likelihood (e.g., high or low) of the misapplication. This determination by block 345 can be output to block 410 (e.g., including an operation misapplication flag (e.g., set with a 1 or 0 bit) to indicate whether or not an operation misapplication occurred and an operation misapplication likelihood to indicate the likelihood of a detected operation misapplication).

Figure 5:
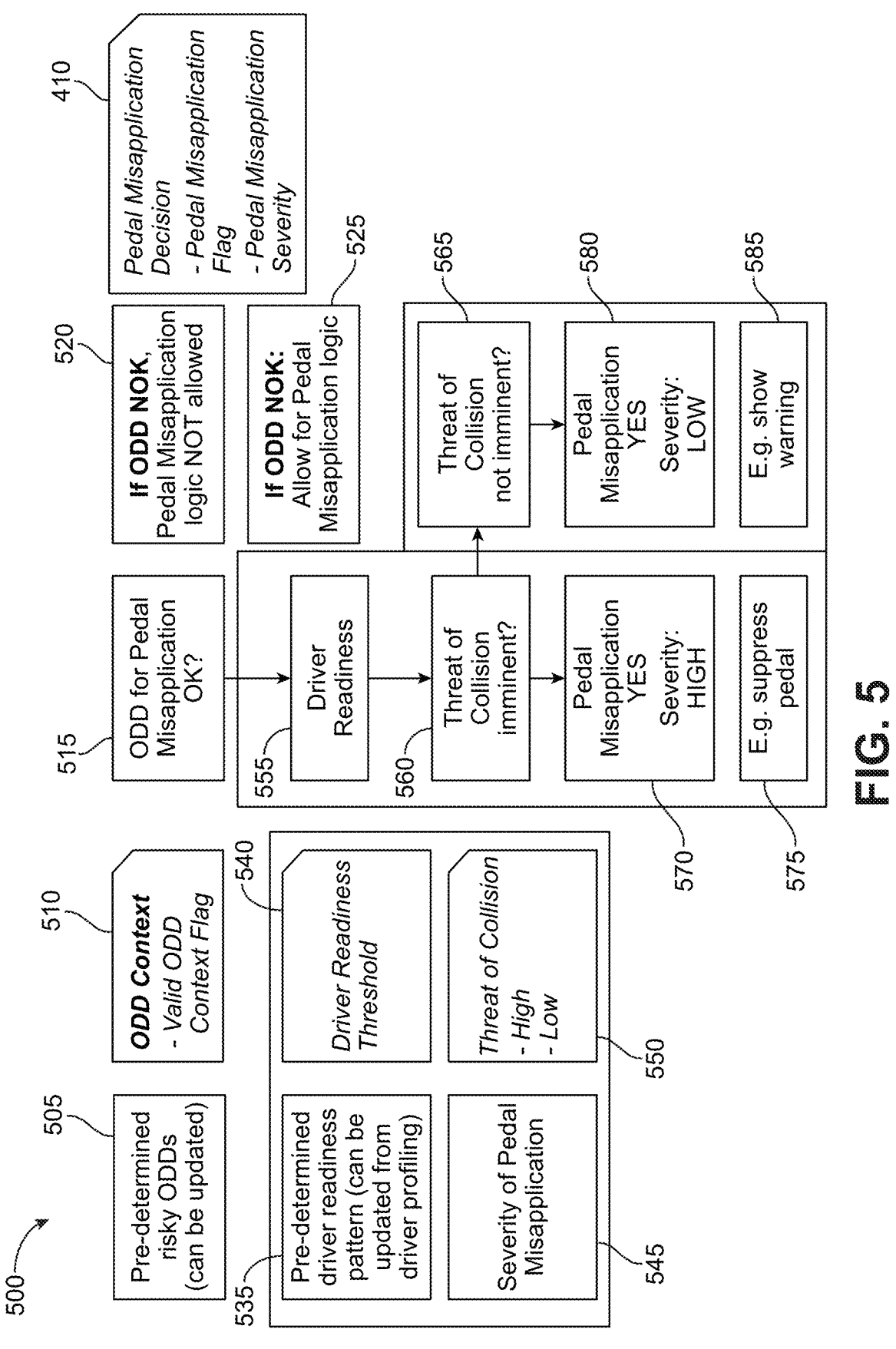
FIG. 5 is a block diagram illustrating an example of a process for determining an operation misapplication feature is applicable, in accordance with some aspects of the present disclosure.
Figure 6:
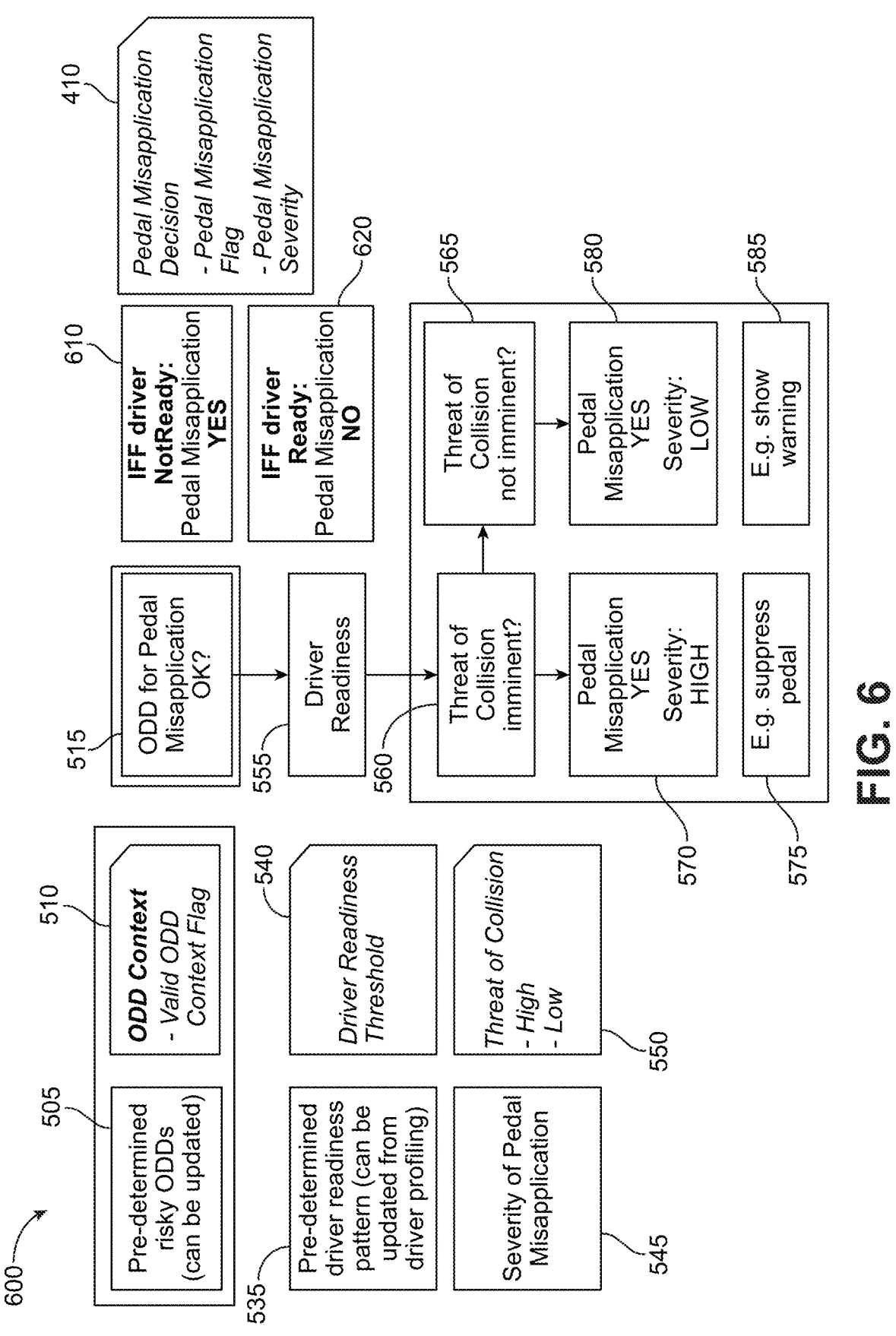
FIG. 6 is a block diagram illustrating an example of a process for determining driver readiness for driving the vehicle, in accordance with some aspects of the present disclosure.
Figure 7:
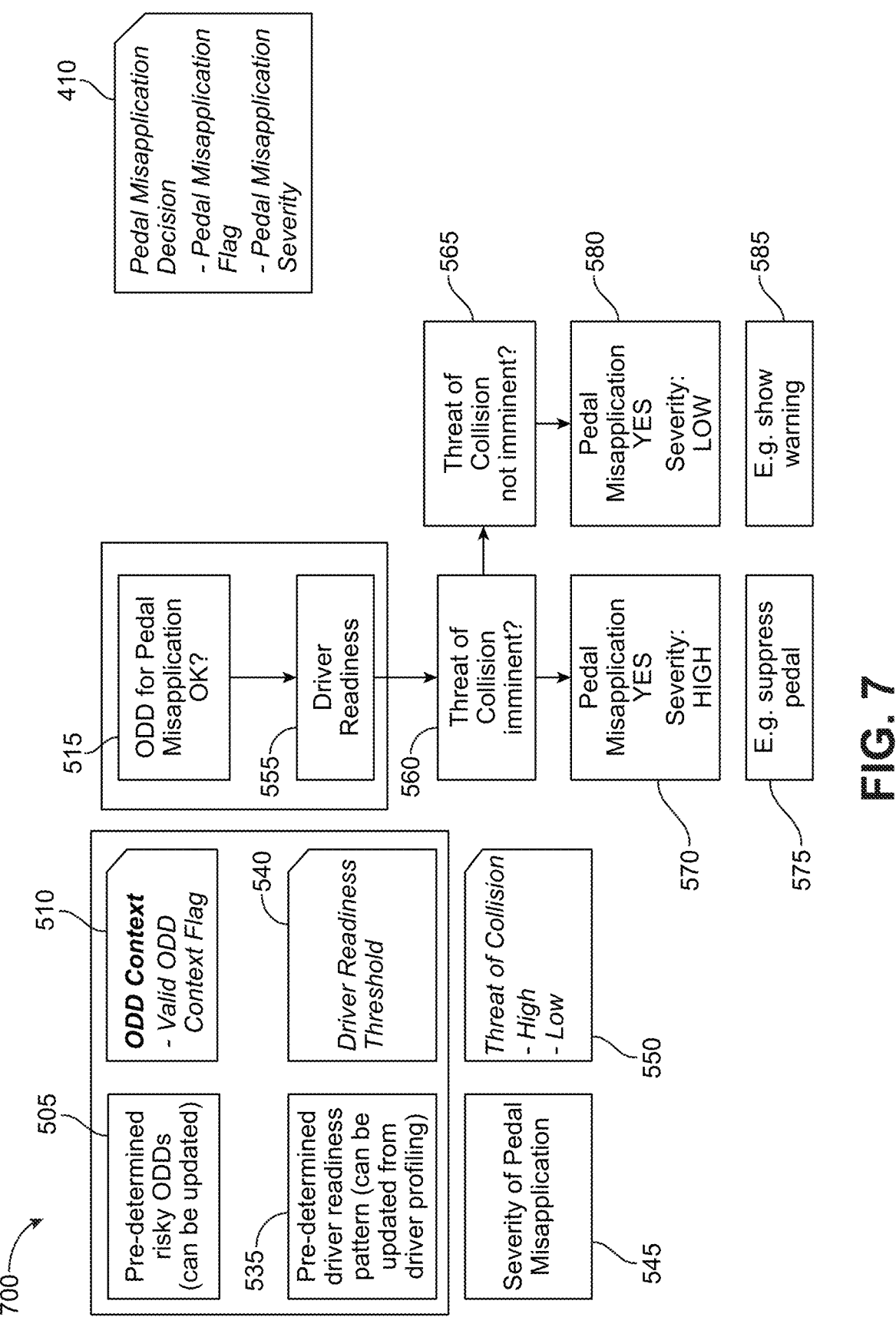
FIG. 7 is a block diagram illustrating an example of a process for determining a threat of a collision, in accordance with some aspects of the present disclosure.

FIGS. 5, 6, and 7 show details of the processes of blocks 330, 335, and 340, respectively. In particular, FIG. 5 is a block diagram illustrating an example of a process 500 for determining an operation misapplication feature is applicable. As previously mentioned, one or more processors of the vehicle can determine an ODD context of the vehicle based on the first traffic sensor data (e.g., obtained from the external sensing 305), the second traffic sensor data (e.g., obtained from the external sensing 305), the additional environment information (e.g., the additional information 315), and/or the vehicle sensor data (e.g., obtained from the vehicle sensor and body 320 sensors). The one or more processors of the vehicle can compare the ODD context of the vehicle to a plurality of predetermined risky ODDs (e.g., block 505, which includes pre-determined risky ODDs, which can be updated periodically). The one or more processors of the vehicle can determine an operation misapplication feature is applicable to the vehicle based on the ODD context of the vehicle matching at least one of the plurality of predetermined risky ODDs. Conversely, the one or more processors of the vehicle can determine an operation misapplication feature is not applicable to the vehicle based on the ODD context of the vehicle not matching at least one of the plurality of predetermined risky ODDs.

In one or more examples, at block 510, a valid ODD context flag (e.g., set with a 1 or 0 bit) can be used to indicate whether or not an operation misapplication feature is applicable to the vehicle. At block 515, the one or more processors can determine whether the operation misapplication, based on the ODD context of the vehicle, is applicable (e.g., whether the ODD context for an operation misapplication is OK). At block 520, if the operation misapplication is not applicable (e.g., the ODD is not OK), the one or more processors will not continue to perform the operation misapplication logic. However, at block 525, if the operation misapplication is applicable (e.g., the ODD is OK), the one or more processors can continue to perform the operation misapplication logic by proceeding to determine driver readiness (e.g., block 335).

FIG. 6 is a block diagram illustrating an example of a process 600 for determining driver readiness for driving the vehicle. As previously mentioned, the one or more processors of the vehicle can determine characteristics of the driver of the vehicle based on the first traffic sensor data (e.g., obtained from the external sensing 305), the second traffic sensor data (e.g., obtained from the external sensing 305), the vehicle sensor data (e.g., obtained from the vehicle sensor and body 320 sensors), the direct driver sensor data (e.g., obtained from driver monitoring 325), and/or the indirect driver sensor data (e.g., obtained from driver monitoring 325). The one or more processors of the vehicle may obtain (e.g., from a cloud server and/or a database within the vehicle) driver profile information, which can include a typical behavior pattern of the driver to drive the vehicle, a state (e.g., temper, fatigue, distraction, etc.) of the driver, and/or a gaze movement of the driver. The one or more processors of the vehicle may determine the characteristics of the driver of the vehicle further based on the driver profile information.

The one or more processors of the vehicle may compare the characteristics of the driver to a plurality of predetermined driver state patterns (e.g., block 535, which includes pre-determined driver readiness patterns, which can be updated from the driver profiling). The one or more processors of the vehicle may determine that the driver is in a state to engage in a driving task associated with the vehicle (e.g., driver readiness is present, such as the driver is ready to engage in the driving task associated with the vehicle) based on the characteristics of the driver matching at least one of the plurality of predetermined driver state patterns. Conversely, the one or more processors of the vehicle can determine that the driver is not in a state to engage in a driving task associated with the vehicle (e.g., driver readiness is not present, such as the driver is not ready to engage in the driving task associated with the vehicle) based on the characteristics of the driver not matching at least one of the plurality of predetermined driver state patterns.

In some examples, the one or more processors of the vehicle may determine that the driver is in a state to engage in a driving task associated with the vehicle (e.g., driver readiness is present, such as the driver is ready to engage in the driving task associated with the vehicle) based the characteristics of the driver matching at least a threshold amount (e.g., driver readiness threshold 540) of the plurality of predetermined driver state patterns. Conversely, the one or more processors of the vehicle can determine that the driver is not in a state to engage in a driving task associated with the vehicle (e.g., driver readiness is not present, such as the driver is not ready to engage in the driving task associated with the vehicle) based on the characteristics of the driver not matching at least the threshold amount (e.g., driver readiness threshold 540) of the plurality of predetermined driver state patterns.

At block 555, the one or more processors can determine whether the driver is ready, based on the characteristics of the driver matching at least a threshold amount (e.g., driver readiness threshold 540) of the plurality of predetermined driver state patterns. At block 610, if the one or more processors determine that the driver is not ready, the one or more processors can determine that there may be an operation misapplication. However, at block 620, if the one or more processors determine that the driver is ready, the one or more processors can determine that there may not be an operation misapplication.

FIG. 7 is a block diagram illustrating an example of a process 700 for determining a threat of a collision. As previously mentioned, at block 545, the one or more processors of the vehicle can determine a likelihood of the operation misapplication of the vehicle based on the first traffic sensor data (e.g., obtained from the external sensing 305), the second traffic sensor data (e.g., obtained from the external sensing 305), and/or vehicle sensor data (e.g., obtained from the vehicle sensor and body 320 sensors). The one or more processors of the vehicle can compare the likelihood of the operation misapplication of the vehicle to a threshold likelihood for the operation misapplication of the vehicle.

At block 550, the one or more processors of the vehicle can determine whether there is a threat of collision based on the likelihood (e.g., high likelihood or low likelihood) of the operation misapplication of the vehicle. At block 560, the one or more processors can determine whether the threat of collision is imminent. At block 570, the one or more processors can determine that the threat of collision is imminent when the likelihood of the operation misapplication of the vehicle is greater than or equal to the threshold likelihood (e.g., a high likelihood). At block 575, the one or more processors of the vehicle can perform an actuation (e.g., an acceleration suppression, applying braking, controlling an engine of the vehicle, controlling steering, driving controls, any combination thereof, and/or other actuation) of the vehicle to mitigate the operation misapplication based on determining the likelihood of the operation misapplication of the vehicle is a high likelihood.

At block 565, the one or more processors can determine whether the threat of collision is not imminent. At block 580, the one or more processors can determine that the threat of collision is not imminent when the likelihood of the operation misapplication of the vehicle is less than the threshold likelihood (e.g., a low likelihood). At block 585, the one or more processors of the vehicle can activate a warning (e.g., an FCW, such as a visual warning, an audio warning, and/or a haptic warning) based on determining the likelihood of the operation misapplication of the vehicle is a low likelihood.

In one or more examples, the determination of the process of FIGS. 5, 6, and 7 can be output to block 410 (e.g., including an operation misapplication flag (e.g., set with a 1 or 0 bit) to indicate whether or not an operation misapplication occurred and an operation misapplication likelihood to indicate the likelihood of a detected operation misapplication).

FIG. 8 is a table 800 illustrating examples of data for determining an ODD context of a vehicle. In FIG. 8, the table 800 is shown to include environment attributes data 810, environmental objects data 820, maps and navigation data 830, and vehicle sensors data 840. In one or more examples, at least some of the data within table 800 may be used by the one or more processors of the vehicle to determine the ODD context of the vehicle (e.g., at block 330 of FIG. 3).

Figure 9:
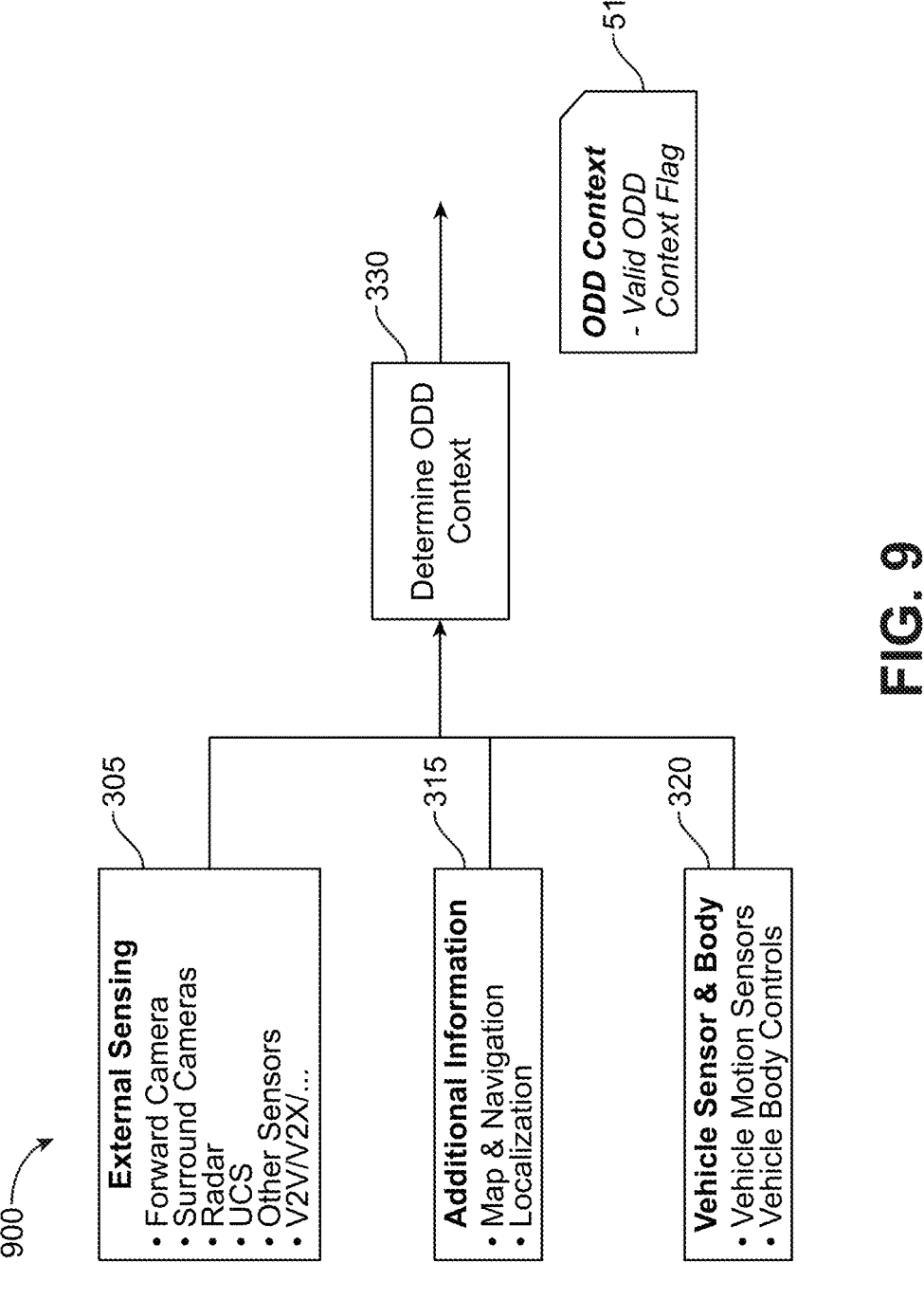
FIG. 9 is a block diagram illustrating an example of a process for determining an operation misapplication feature is applicable based on the ODD context, in accordance with some aspects of the present disclosure.

FIG. 9 is a block diagram illustrating an example of a process 900 for determining an operation misapplication feature is applicable based on the ODD context. In FIG. 9, at block 330, one or more processors of the vehicle can determine an ODD context of the vehicle based on the first traffic sensor data (e.g., obtained from the external sensing 305), the second traffic sensor data (e.g., obtained from the external sensing 305), the additional environment information (e.g., the additional information 315), and/or the vehicle sensor data (e.g., obtained from the vehicle sensor and body 320 sensors). The determination at block 330 can be outputted to block 910. At block 910, a valid ODD context flag (e.g., set with a 1 or 0 bit) can be used to indicate whether or not an operation misapplication feature is applicable to the vehicle.

Figure 10:
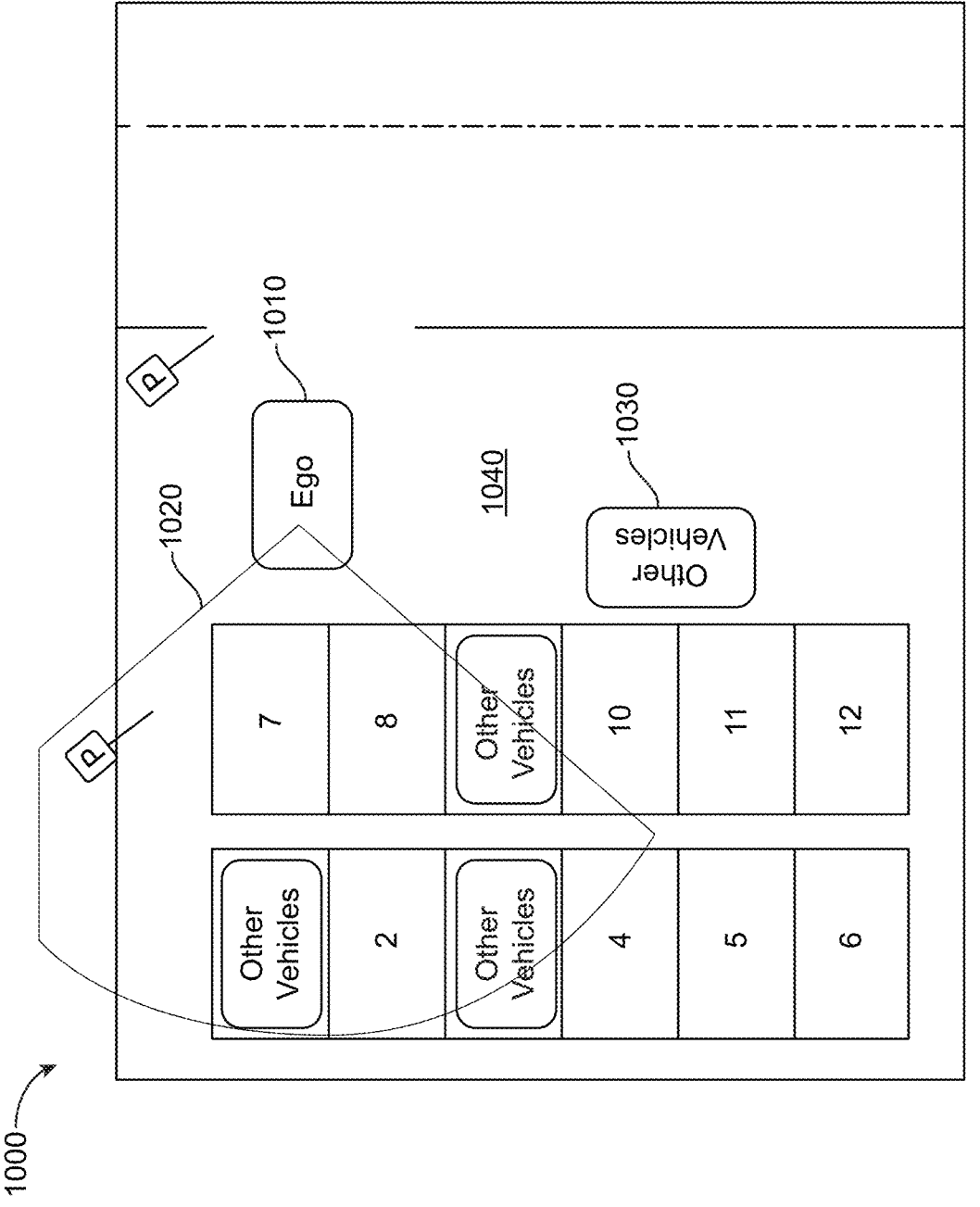
FIG. 10 is a diagram illustrating an example scenario where there is a valid ODD determination and a pedal misapplication is applicable, in accordance with some aspects of the present disclosure.
Figure 11:
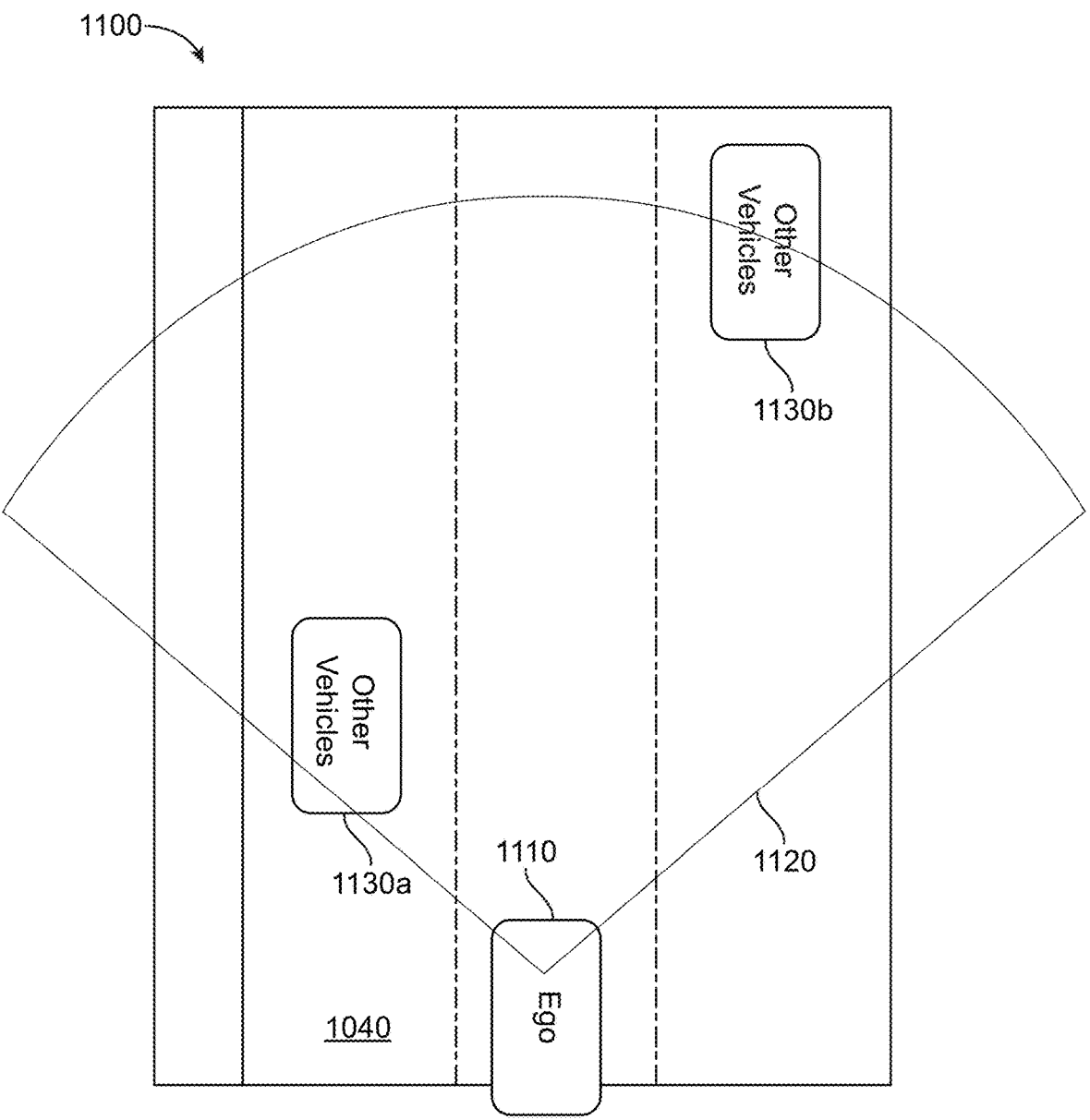
FIG. 11 is a diagram illustrating an example scenario where there is an invalid ODD determination and a pedal misapplication is not applicable, in accordance with some aspects of the present disclosure.
Figure 12:
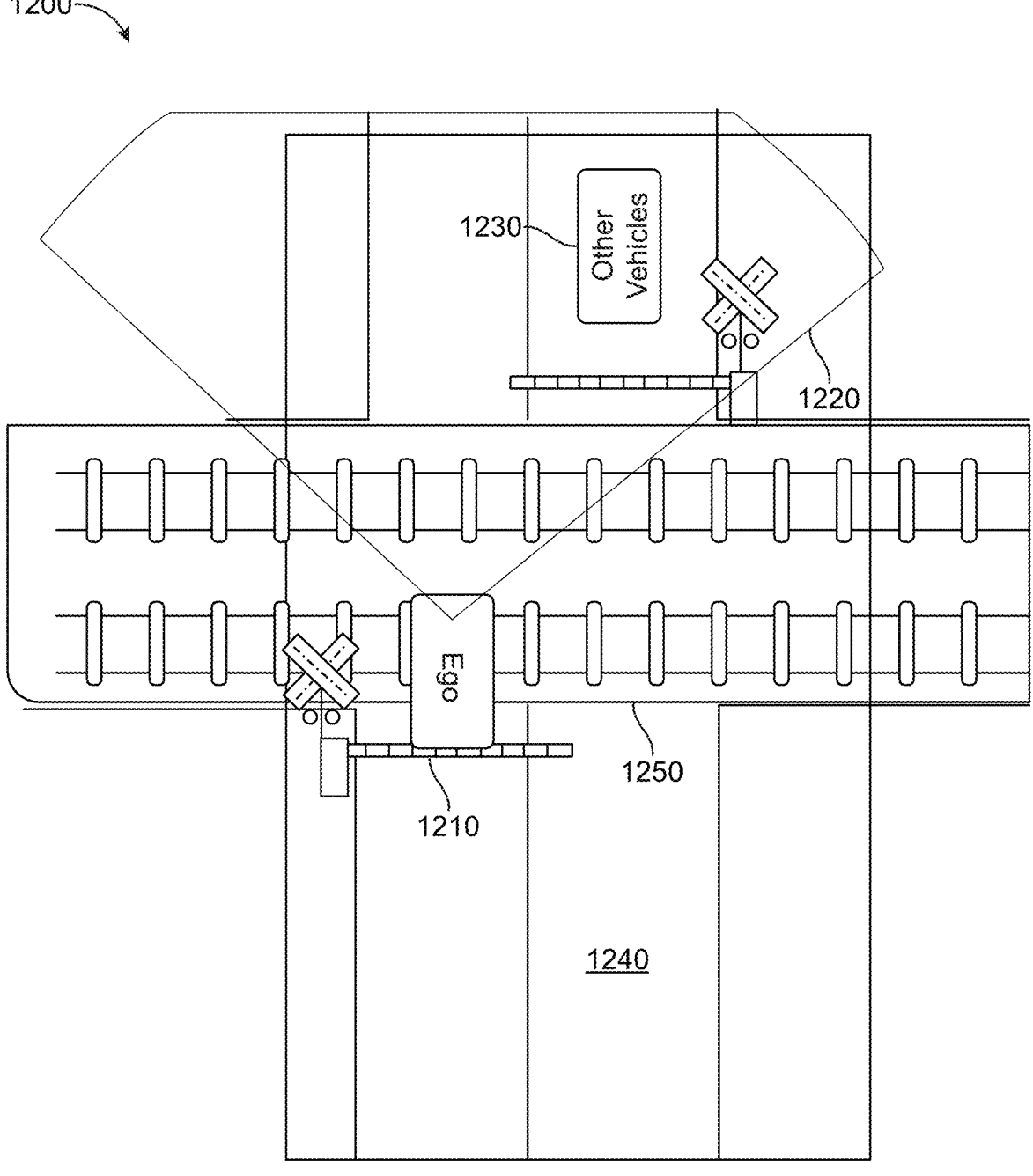
FIG. 12 is a diagram illustrating another example scenario where there is an invalid ODD determination and a pedal misapplication is not applicable, in accordance with some aspects of the present disclosure.

FIGS. 10, 11, and 12 show example scenarios 1000, 1100, 1200 related to ODD determinations. While example scenarios 1000, 1100, and 1200 are provided for illustrative purposes, the systems and techniques described herein apply to other scenarios. In particular, FIG. 10 is a diagram illustrating an example scenario 1000 where there is a valid ODD determination and a pedal misapplication is applicable. In FIG. 10, a vehicle 1010 (e.g., an ego vehicle) is shown to be driving in a parking lot 1040. The parking lot 1040 in FIG. 10 is shown to include twelve (12) parking spaces. Three other vehicles are parked in three of the parking spaces of the parking lot 1040. These three other vehicles are shown to be within the field of view (FOV) 1020 of external sensors of the vehicle 1010 and, as such, the vehicle 1010 is aware of these three obstacles (e.g., the three parked vehicles).

The external sensors on the vehicle 1010 can detect parking zone markings, boundaries, walls, parking signs, and the stationary parked vehicles. The parking lot 1040, which is privately owned and not a public road, may not be included within map and navigation information provided to the vehicle 1010. The speed limit of the parking lot 1040 may be low, such as 15 kilometers per hour (km/h). Another vehicle 1030 is shown to be driving (e.g., at a low speed) towards the vehicle 1010 in the parking lot 1040. This vehicle 1030 is not within the FOV 1020 of the vehicle 1010.

In one or more examples, the one or more processors of the vehicle 1010 can determine the ODD context of the vehicle 1010 based on the data sensed by the external sensors of the vehicle 1010, the map and navigation data, and the speed limit data. In some examples, the one or more processors of the vehicle 1010 may determine a valid ODD determination based on the vehicle 1010 being within a situation (e.g., a parking lot situation) where an operation (e.g., pedal) misapplication is likely to occur. Since there is a valid ODD determination, a pedal misapplication is applicable.

FIG. 11 is a diagram illustrating an example scenario 1100 where there is an invalid ODD determination and a pedal misapplication is not applicable. In FIG. 11, a vehicle 1110 (e.g., an ego vehicle) is shown to be driving on a highway 1140. The highway 1140 in FIG. 11 is shown to include three lanes. Other vehicles 1130a, 1130b are driving on the highway 1140 along with vehicle 1110. These other vehicles 1130a, 1130b are shown to be within the FOV 1120 of external sensors of the vehicle 1110 and, as such, the vehicle 1110 is aware of these two obstacles (e.g., the two vehicles 1130a, 1130b).

The external sensors on the vehicle 1110 can detect lane markings, other moving vehicles, and a road edge of the highway 1140. The highway 1140, which is a public road, may be included within map and navigation information provided to the vehicle 1110. The speed limit of the highway 1140 may be high.

In one or more examples, the one or more processors of the vehicle 1110 can determine the ODD context of the vehicle 1110 based on the data sensed by the external sensors of the vehicle 1110, the map and navigation data, and the speed limit data. In some examples, the one or more processors of the vehicle 1110 may determine an invalid ODD determination based on the vehicle 1110 being within a situation (e.g., a highway driving situation) where an operation (e.g., pedal) misapplication is not likely to occur. Since there is an invalid ODD determination, a pedal misapplication is not applicable.

FIG. 12 is a diagram illustrating another example scenario 1200 where there is an invalid ODD determination and a pedal misapplication is not applicable. In FIG. 12, a vehicle 1210 (e.g., an ego vehicle) is shown to be driving across railroad tracks 1250. The railroad tracks 1250 in FIG. 12 are shown to cross a road 1240 including two lanes. Another vehicle 1230 is driving on the road 1240 towards the railroad tracks 1250. The other vehicle 1230 is shown to be within the FOV 1220 of external sensors of the vehicle 1210 and, as such, the vehicle 1210 is aware of this obstacle (e.g., vehicle 1230).

The external sensors on the vehicle 1210 can detect the railroad crossing, the railroad tracks 1250, and barriers of the railroad tracks 1250. The railroad tracks 1250, which cross a public road (e.g., road 1240), may be included within map and navigation information provided to the vehicle 1210. No stopping on the railroad tracks 1250 may be allowed by the traffic rules.

In one or more examples, the one or more processors of the vehicle 1210 can determine the ODD context of the vehicle 1210 based on the data sensed by the external sensors of the vehicle 1210, the map and navigation data, and the traffic rules (e.g., no stopping on railroad tracks 1250). In some examples, the one or more processors of the vehicle 1210 may determine an invalid ODD determination based on the vehicle 1210 being within a situation (e.g., crossing railroad tracks situation) where an operation (e.g., pedal) misapplication is not likely to occur. Since there is an invalid ODD determination, a pedal misapplication is not applicable.

Figure 13:
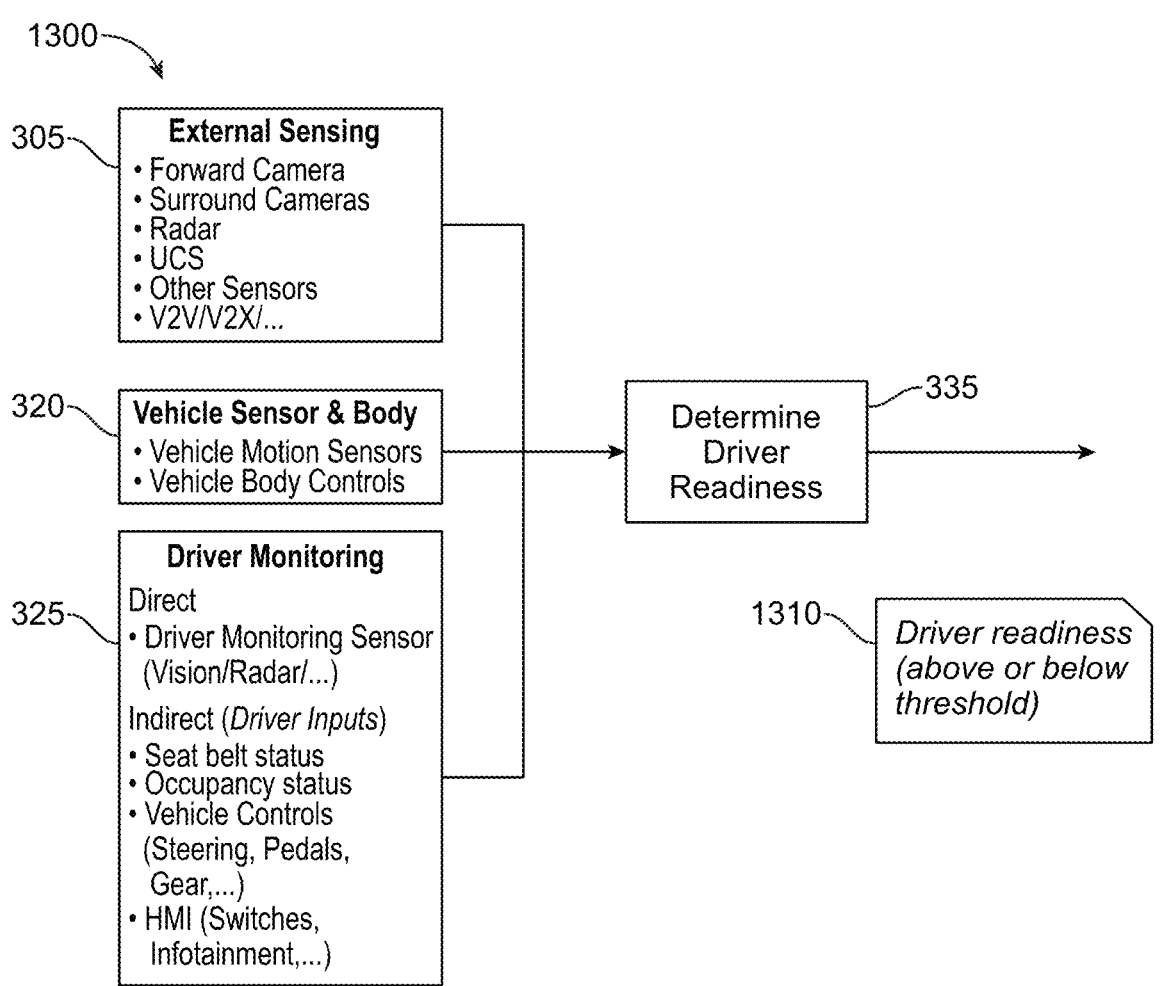
FIG. 13 is a block diagram illustrating an example of a process for determining driver readiness for driving the vehicle based on sensor data, in accordance with some aspects of the present disclosure.

FIG. 13 is a block diagram illustrating an example of a process 1300 for determining driver readiness for driving the vehicle based on sensor data. In FIG. 13, at block 335, the one or more processors of the vehicle can determine characteristics of the driver of the vehicle based on the first traffic sensor data (e.g., obtained from the external sensing 305), the second traffic sensor data (e.g., obtained from the external sensing 305), the vehicle sensor data (e.g., obtained from the vehicle sensor and body 320 sensors), the direct driver sensor data (e.g., obtained from driver monitoring 325), and/or the indirect driver sensor data (e.g., obtained from driver monitoring 325).

The one or more processors of the vehicle can determine that the driver is in a state to engage in a driving task associated with the vehicle (e.g., driver readiness is present, such as the driver is ready to engage in the driving task associated with the vehicle) based the characteristics of the driver matching at least a threshold amount (e.g., driver readiness threshold 1310) of the plurality of predetermined driver state patterns. Conversely, the one or more processors of the vehicle can determine that the driver is not in a state to engage in a driving task associated with the vehicle (e.g., driver readiness is not present, such as the driver is not ready to engage in the driving task associated with the vehicle) based on the characteristics of the driver not matching at least the threshold amount (e.g., driver readiness threshold 1310) of the plurality of predetermined driver state patterns.

FIGS. 14, 15, 16, and 17 show example processes 1400, 1500, 1600, and 1700 for determining driver readiness (e.g., determining the driver is ready to engage in the driving task). Whether a driver is ready to engage in the driving task can be used for making an operation misapplication decision (e.g., block 345). A vehicle with a distracted driver (e.g., a driver that is not ready) is more likely to need support from an operation misapplication feature. In one or more examples, a driver may be considered to be ready when the driver is seated, buckled, has both hands on the steering wheel, and is looking at a relevant gaze zone ahead at traffic. In some examples, a relevant gaze zone can depend upon a gear (e.g., drive or reverse) of the car (e.g., when the car is in reverse, different zones can be relevant as compared to when the car is in drive).

Figure 14:
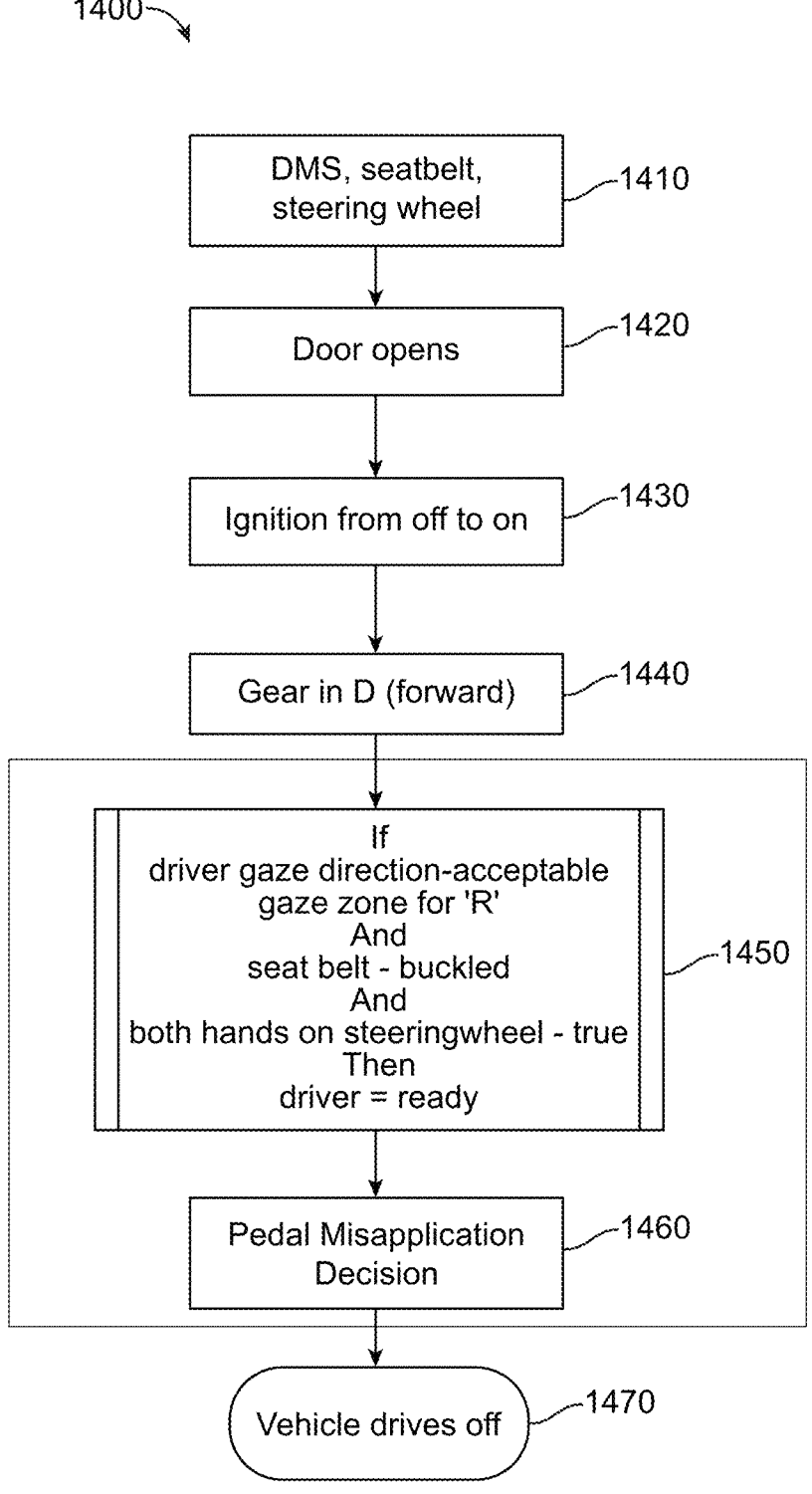
FIG. 14 is a flow chart illustrating an example of a process for determining whether a gear of a vehicle is in drive, in accordance with some aspects of the present disclosure.

FIG. 14 is a flow chart illustrating an example of a process 1400 for determining whether a gear of a vehicle is in drive. In FIG. 14, during operation of the process 1400, at block 1410, a driver monitoring system (DMS) of the vehicle can determine (e.g., sense) that the seatbelt of the driver is buckled and that both of the driver's hands are on the steering wheel of the vehicle. At block 1420, the DMS can determine (e.g., sense) that the driver's side door of the vehicle has opened. At block 1430, the DMS can determine (e.g., sense) that the ignition of the vehicle has been turned from off to on. At block 1440, the DMS can determine (e.g., sense) that the gear of the vehicle has been shifted into drive (D).

At decision block 1450, one or more processors of the vehicle can determine that the driver is ready, based on determining that that driver's gaze direction is acceptable for the vehicle being shifted into drive, the driver's seat belt is buckled, and both of the driver's hands are on the steering wheel. At block 1460, the one or more processors can make an operation (e.g., pedal) misapplication decision, based on determining that the driver is ready (or not ready). For example, if the one or more processors of the vehicle determine that the driver is ready, the one or more processors can make an operation (e.g., pedal) misapplication decision that an operation misapplication has not occurred. At block 1470, the vehicle can simply drive off.

Figure 15:
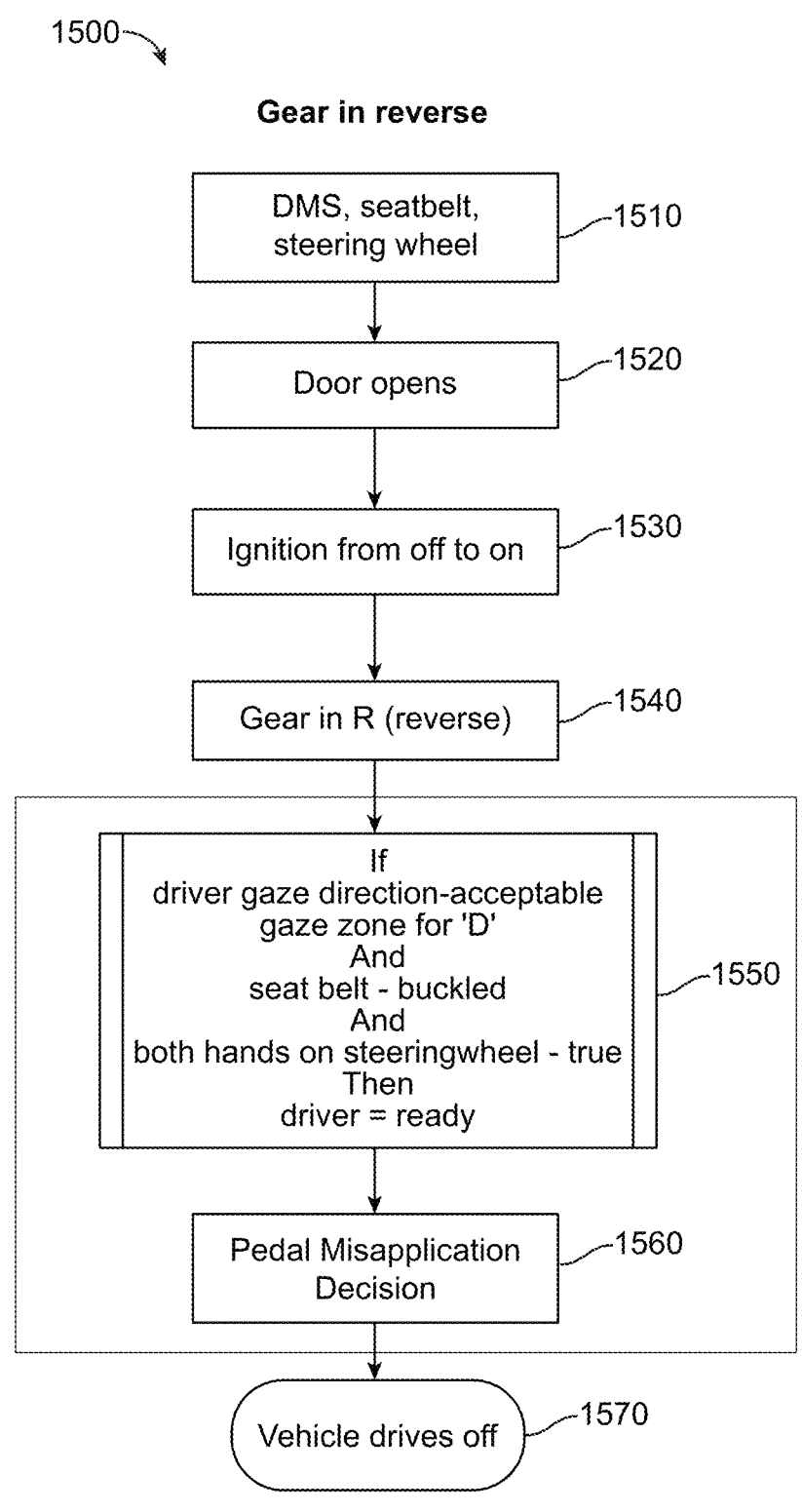
FIG. 15 is a flow chart illustrating an example of a process for determining whether a gear of a vehicle is in reverse, in accordance with some aspects of the present disclosure.

FIG. 15 is a flow chart illustrating an example of a process 1500 for determining whether a gear of a vehicle is in reverse. In FIG. 15, during operation of the process 1500, at block 1510, a DMS of the vehicle can determine (e.g., sense) that the seatbelt of the driver is buckled and that both of the driver's hands are on the steering wheel of the vehicle. At block 1520, the DMS can determine (e.g., sense) that the driver's side door of the vehicle has opened. At block 1530, the DMS can determine (e.g., sense) that the ignition of the vehicle has been turned from off to on. At block 1540, the DMS can determine (e.g., sense) that the gear of the vehicle has been shifted to reverse (R).

At decision block 1550, one or more processors of the vehicle can determine that the driver is ready, based on determining that that driver's gaze direction is acceptable for the vehicle being shifted into reverse, the driver's seat belt is buckled, and both of the driver's hands are on the steering wheel. At block 1560, the one or more processors can make an operation (e.g., pedal) misapplication decision, based on determining that the driver is ready (or not ready). In one or more examples, if the one or more processors of the vehicle determine that the driver is ready, the one or more processors can make an operation (e.g., pedal) misapplication decision that an operation misapplication has not occurred. At block 1570, the vehicle can drive off.

FIG. 16 is a flow chart illustrating an example of a process 1600 for determining whether a vehicle is in a drive-through lane for receiving an order (e.g., from a fast food restaurant). In FIG. 16, during operation of the process 1600, at block 1610, a DMS of the vehicle can determine (e.g., sense) that the seatbelt of the driver is buckled, that both of the driver's hands are on the steering wheel of the vehicle, that the driver is seated in the driver's seat, and that the driver's side window is open. At block 1620, the DMS can determine (e.g., sense) that the vehicle is at a standstill (e.g., the vehicle is stationary). At block 1630, the DMS can determine (e.g., sense) that the gear of the vehicle has been shifted to drive (D) or reverse (R).

At decision block 1640, one or more processors of the vehicle can determine that the driver is not ready, based on determining that that driver's gaze direction is not acceptable for the vehicle being shifted into drive or reverse, the driver's seat belt is buckled, both of the driver's hands are not on the steering wheel, the driver's side window is open, and the driver is not seated (e.g., the driver is moving around). At block 1650, the one or more processors can make an operation (e.g., pedal) misapplication decision, based on determining that the driver is not ready (or ready). In one or more examples, if the one or more processors of the vehicle determine that the driver is not ready, the one or more processors can make an operation (e.g., pedal) misapplication decision that an operation misapplication has occurred. At block 1660, the vehicle can drive off.

FIG. 17 is a flow chart illustrating an example of a process 1700 for determining whether there is a distraction to the driver in a backseat of a vehicle. In FIG. 17, during operation of the process 1700, at block 1710, a DMS of the vehicle can determine (e.g., sense) that the seatbelt of the driver is buckled, that both of the driver's hands are on the steering wheel of the vehicle, and that the driver is seated in the driver's seat. At block 1720, the DMS can determine (e.g., sense) that the vehicle is at a standstill (e.g., the vehicle is stationary). At block 1730, the DMS can determine (e.g., sense) that the gear of the vehicle has been shifted to drive (D) or reverse (R).

At decision block 1740, one or more processors of the vehicle can determine that the driver is not ready, based on determining that that driver's gaze direction is not acceptable for the vehicle being shifted into drive or reverse, the driver's seat belt is buckled, both of the driver's hands are not on the steering wheel, and the driver is not seated (e.g., the driver is moving around). At block 1750, the one or more processors can make an operation (e.g., pedal) misapplication decision, based on determining that the driver is not ready (or ready). For example, if the one or more processors of the vehicle determine that the driver is not ready, the one or more processors can make an operation (e.g., pedal) misapplication decision that an operation misapplication has occurred. At block 1760, the vehicle can drive off.

As previously mentioned, the driver readiness determination can be based on available sensor data in the vehicle combined with driver profile information. In one or more examples, the driver profile information may include, but is not limited to, a typical behavior pattern of the driver to drive the vehicle, a temper of the driver, and/or a gaze movement of the driver.

FIG. 18 is a flow chart illustrating an example of a process 1800 for determining driver readiness for driving the vehicle based on driver profile information. In FIG. 18, at block 1810, the process 1800 starts. At block 1820, a driver profile (e.g., including typical behavior for the driver, a temper of the driver, and/or a gaze movement of the driver) can be obtained (e.g., from a cloud or from local storage within the vehicle) and inputted into decision block 1840. At block 1830, a temper of the driver can be obtained (e.g., from a previous driver readiness determination cycle) and inputted into decision block 1840.

At decision block 1840, one or more processors of the vehicle can determine to adjust the driver readiness threshold to a low threshold (e.g., a low threshold needed to be met for receiving assistance from an operation misapplication feature), if the temper of the driver from the previous cycle (e.g., block 1830) is greater than the temper of the driver from the driver profile (e.g., block 1820), and if the temper of the driver from the previous cycle (e.g., block 1830) is less than a forgetting time (e.g., a predetermined amount of time for forgetting about the onset of the temper). When there is a short amount of forgetting time, it is likely that the driver will need assistance and, as such, the driver readiness threshold can be adjusted to a low threshold.

Conversely, the one or more processors of the vehicle can determine to adjust the driver readiness threshold to a high threshold (e.g., a high threshold needed to be met for receiving assistance from an operation misapplication feature), if the temper of the driver from the previous cycle (e.g., block 1830) is greater than the temper of the driver from the driver profile (e.g., block 1820), and if the temper of the driver from the previous cycle (e.g., block 1830) is greater than the forgetting time. When there is a large amount of forgetting time, it is likely that the driver will not need assistance and, as such, the driver readiness threshold can be adjusted to a high threshold. At block 1850, the one or more processors can adjust the driver readiness threshold accordingly.

Figure 19:
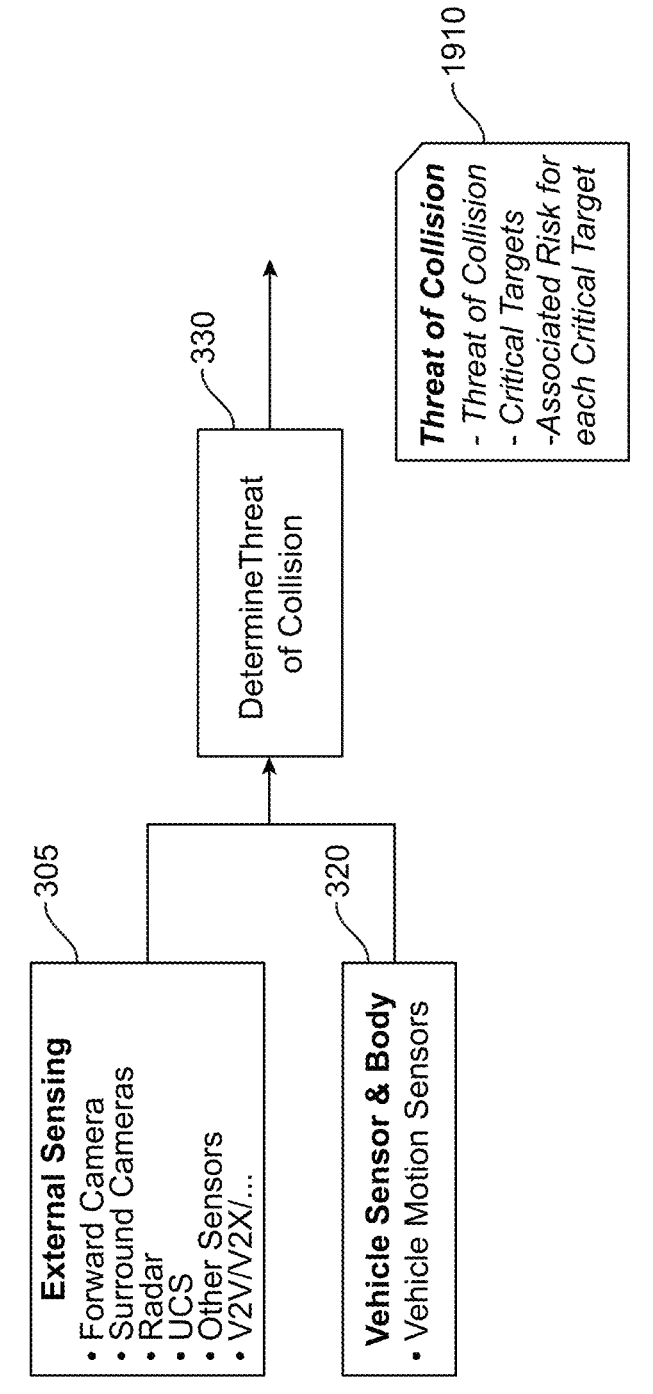
FIG. 19 is a block diagram illustrating an example of a process for determining a threat of a collision based on sensor data, in accordance with some aspects of the present disclosure.

FIG. 19 is a block diagram illustrating an example of a process 1900 for determining a threat of a collision based on sensor data. In FIG. 19, at block 340, one or more processors of the vehicle may determine a likelihood of the operation misapplication of the vehicle based on the first traffic sensor data (e.g., obtained from the external sensing 305), the second traffic sensor data (e.g., obtained from the external sensing 305), and/or vehicle sensor data (e.g., obtained from the vehicle sensor and body 320 sensors). The one or more processors of the vehicle may compare the likelihood of the operation misapplication of the vehicle to a threshold likelihood for the operation misapplication of the vehicle. The one or more processors of the vehicle can determine the likelihood of the operation misapplication of the vehicle is a high likelihood (e.g., a threat of collision of the vehicle is imminent) based on the determination of the likelihood of the operation misapplication of the vehicle is greater than or equal to the threshold likelihood. Conversely, the one or more processors of the vehicle can determine the likelihood of the operation misapplication of the vehicle is a low likelihood (e.g., the threat of collision of the vehicle is not imminent) based on the determination of the likelihood of the operation misapplication of the vehicle is less than the threshold likelihood. The output of block 340 (e.g., determine threat of collision), which is shown at block 1910, may include a determined threat of collision to the vehicle (e.g., an imminent threat or not an imminent threat), critical targets, and an associated risk for each critical target.

In one or more examples, the one or more processors may determine the risk of collision with targets of interest in the environment of the vehicle. In some examples, environment perception from different sensing systems can be utilized to identify and monitor targets of interest within the environment. Sensing technologies, such as UCS, camera sensors, radar sensors, and/or LiDAR sensors can provide direct detection data of targets within the environment. Information (e.g., data) from indirect sensing technologies (e.g., V2X and V2V communications) can be utilized to monitor targets, which may be identified by direct perception.

In some examples, motion vectors for targets of interest can be analyzed by the one or more processors of the vehicle to identify movement patterns associated with the targets. Potential movement patterns can include, but are not limited to, static patterns and dynamic movement patterns (e.g., pedestrian, bicycle, and vehicle movement patterns). Based on these movement patterns, the one or more processors can calculate potential future movement for each of the targets of interest.

In one or more examples, vehicle motion sensors and driver inputs can be utilized to determine the projected path of the vehicle (e.g., the ego vehicle). The one or more processors can calculate all of the projected paths of the vehicle in an event of an operation (e.g., pedal, gear, or steering) misapplication.

In some examples, the one or more processors of the vehicle can perform an analysis of the projected paths of the targets of interest and the vehicle (e.g., the ego vehicle). The analysis can use factors, such as the vehicle motion limits, to eliminate and optimize the solution. The threat of collision and associated critical targets may be identified by the one or more processors. The one or more processors can also determine a risk level for collision with each of the critical targets. These determinations can be used to determine the pedal misapplication decision (e.g., block 345).

FIG. 20 is a flow chart illustrating an example of a process 2000 for mitigating operation misapplications of a vehicle. The process 2000 can be performed by a computing device or by a component, system, or apparatus of the computing device (e.g., a chipset of the device, one or more processors of the device such as one or more central processing units (CPUs), digital signal processors (DSPs), graphics processing units (GPUs), etc., any combination thereof, or other component or system of the device) for mitigating an operation misapplication of a vehicle. The computing device may be the vehicle (e.g., vehicle 100 of FIG. 1, vehicle 1010 of FIG. 10, vehicle 1110 of FIG. 11, or vehicle 1210 of FIG. 12), a part of or within a vehicle (e.g., a system of the vehicle, such as an advanced driver-assistance system (ADAS) system), or other device. The operations of the process 2000 may be implemented as software components that are executed and run on one or more processors (e.g., processor 2110 of FIG. 21 or other processor(s)) of the device. Further, the transmission and reception of signals by the device in the process 2000 may be enabled, for example, by one or more antennas and/or one or more transceivers (e.g., wireless transceiver(s)) of the device.

At block 2010, the computing device (or component thereof) can determine an operation misapplication feature is applicable to a vehicle based on an operational design domain (ODD) context associated with the vehicle matching at least one ODD of a plurality of predetermined ODDs. For instance, as described herein, the ODD context associated with the vehicle can include attributes of an environment of the vehicle, one or more objects within the environment of the vehicle, attributes of motion of the vehicle, any combination thereof, and/or other attributes. In some aspects, the operation misapplication of the vehicle is a pedal misapplication of the vehicle, a gear misapplication of the vehicle, a steering misapplication of the vehicle, any combination thereof, and/or other operation misapplication.

At block 2020, the computing device (or component thereof) can determine, based on a comparison of characteristics of a driver of the vehicle to a plurality of predetermined driver state patterns, the driver is not ready to engage in a driving task associated with the vehicle. In some aspects, the computing device (or component thereof) can determine the characteristics of the driver of the vehicle based on sensor data associated with the vehicle. For instance, the sensor data associated with the vehicle can include traffic sensor data, vehicle sensor data from one or more sensors of the vehicle, map data, sensor data from one or more messages, any combination thereof, and/or other data. In some cases, the computing device (or component thereof) can determine the characteristics of the driver of the vehicle further based on driver profile information include a behavior pattern of the driver to drive the vehicle, a temper of the driver, one or more button presses, direct inputs from the driver, indirect inputs from the driver, a gaze pattern of the driver, any combination thereof, and/or other information.

At block 2030, the computing device (or component thereof) can determine the operation misapplication of the vehicle is a first type of operation misapplication. In some aspects, the computing device (or component thereof) can determine a first classification of the operation misapplication of the vehicle based on sensor data associated with the vehicle. For instance, in some cases, the computing device (or component thereof) can determine a likelihood of the operation misapplication of the vehicle is one of greater than or equal to a threshold likelihood for the operation misapplication (e.g., indicating a high risk or severity of operation misapplication). In such cases, the computing device (or component thereof) can determine the first classification based on the likelihood of the operation misapplication of the vehicle being one of greater than or equal to the threshold likelihood for the operation misapplication. In such aspects, the computing device (or component thereof) can determine, based on the first classification, the operation misapplication of the vehicle is the first type of operation misapplication.

In some aspects, the computing device (or component thereof) can determine a second classification of the operation misapplication of the vehicle based on the sensor data associated with the vehicle. For example, in some cases, the computing device (or component thereof) can determine a likelihood of the operation misapplication of the vehicle is one of less than or equal to the threshold likelihood for the operation misapplication. In such cases, the computing device (or component thereof) can determine the second classification based on the likelihood of the operation misapplication of the vehicle being one of less than or equal to the threshold likelihood for the operation misapplication. In such aspects, the computing device (or component thereof) can determine, based on the second classification, an additional operation misapplication of the vehicle is a second type of operation misapplication.

In some cases, the first type of operation misapplication is based on the operation misapplication feature being applicable to the vehicle, the driver not being ready to engage in the driving task, and a likelihood of the operation misapplication of the vehicle being one of greater than or equal to the threshold likelihood for the operation misapplication. In some examples, the computing device (or component thereof) can determine a second type of operation misapplication based on an additional operation misapplication feature being applicable to the vehicle, the driver not being ready to engage in the driving task, and a likelihood of the operation misapplication of the vehicle being one of less than or equal to the threshold likelihood for the operation misapplication.

At block 2040, the computing device (or component thereof) can actuate the vehicle to mitigate the operation misapplication based on determining the operation misapplication is the first type of operation misapplication. In some aspects, the computing device (or component thereof) can actuate, based on determining the operation misapplication is the first type of operation misapplication noted previously, the vehicle using a first type of actuation. In some cases, the computing device (or component thereof) can actuate, based on determining the operation misapplication is the second type of operation misapplication noted previously, the vehicle using a second type of actuation to mitigate the additional operation misapplication. For instance, the computing device (or component thereof) may output a warning (as an example of the second type of actuation) to the driver based on determining the additional operation misapplication is the second type of operation misapplication.

In some cases, actuating the vehicle to mitigate the operation misapplication includes acceleration suppression, brake application, drive control (e.g., steering control, engine control in a gasoline-powered vehicle, battery control in an electric vehicle, any combination thereof, and/or other drive control), any combination thereof, and/or other actuation. For example, to actuate the vehicle to mitigate the operation misapplication, the computing device (or component thereof) can perform acceleration suppression, brake application, drive control, any combination thereof, and/or other actuation.

In some examples, the computing device may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 2000 is illustrated as a logical flow diagram, the operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 2000 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 21:
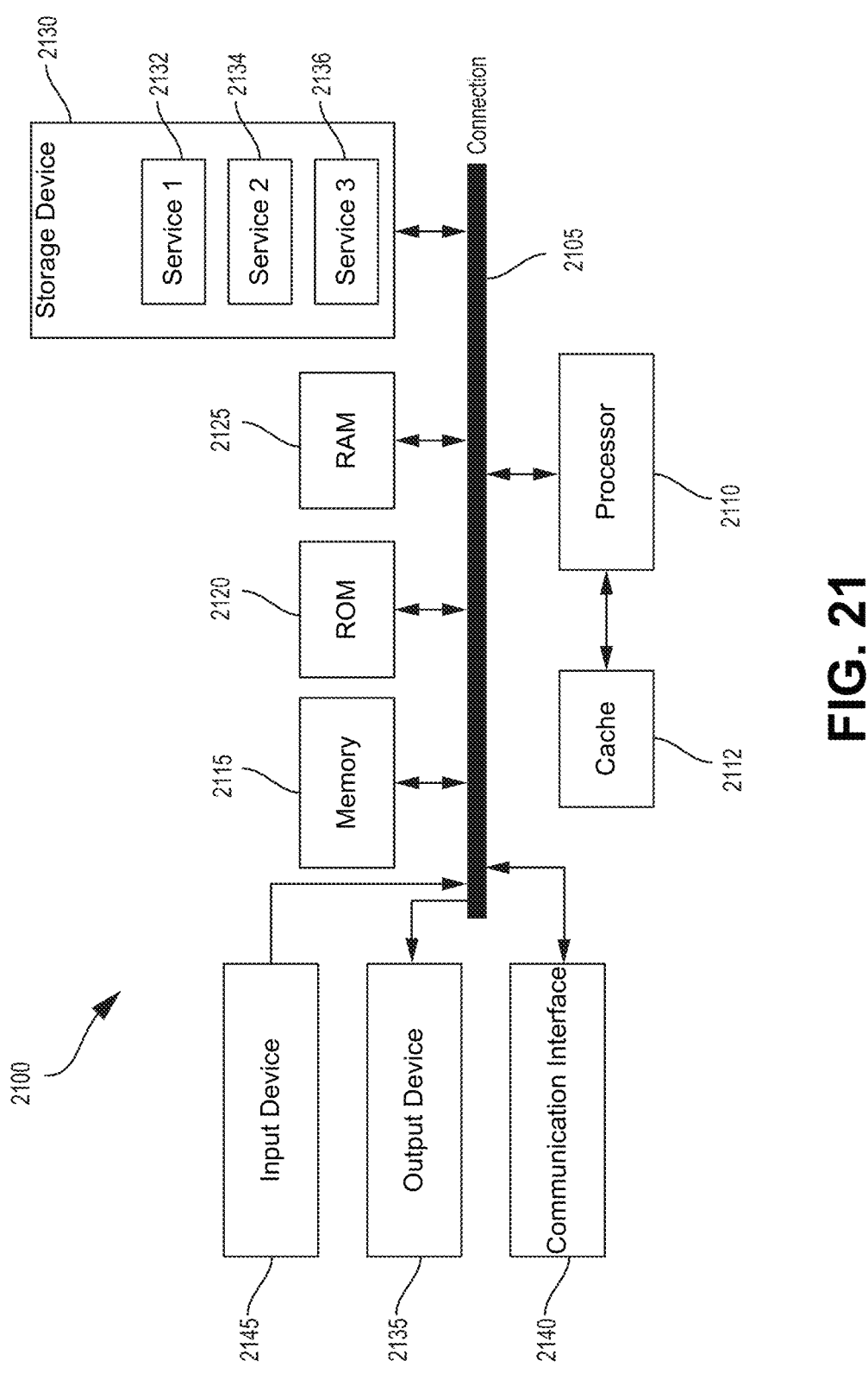
FIG. 21 illustrates an example computing system, according to aspects of the disclosure.

FIG. 21 is a block diagram illustrating an example of a computing system 2100, which may be employed by the disclosed system for mitigating operation misapplications of a vehicle. In particular, FIG. 21 illustrates an example of computing system 2100, which can be for example any computing device making up internal computing system, a remote computing system, a camera, or any component thereof in which the components of the system are in communication with each other using connection 2105. Connection 2105 can be a physical connection using a bus, or a direct connection into processor 2110, such as in a chipset architecture. Connection 2105 can also be a virtual connection, networked connection, or logical connection.

In some aspects, computing system 2100 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 2100 includes at least one processing unit (CPU or processor) 2110 and connection 2105 that communicatively couples various system components including system memory 2115, such as read-only memory (ROM) 2120 and random access memory (RAM) 2125 to processor 2110. Computing system 2100 can include a cache 2112 of high-speed memory connected directly with, in close proximity to, or integrated as part of processor 2110.

Processor 2110 can include any general purpose processor and a hardware service or software service, such as services 2132, 2134, and 2136 stored in storage device 2130, configured to control processor 2110 as well as a special-purpose processor where software instructions are incorporated into the actual processor design. Processor 2110 may essentially be a completely self-contained computing system, containing multiple cores or processors, a bus, memory controller, cache, etc. A multi-core processor may be symmetric or asymmetric.

To enable user interaction, computing system 2100 includes an input device 2145, which can represent any number of input mechanisms, such as a microphone for speech, a touch-sensitive screen for gesture or graphical input, keyboard, mouse, motion input, speech, etc. Computing system 2100 can also include output device 2135, which can be one or more of a number of output mechanisms. In some instances, multimodal systems can enable a user to provide multiple types of input/output to communicate with computing system 2100.

Computing system 2100 can include communications interface 2140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 2140 may also include one or more range sensors (e.g., LIDAR sensors, laser range finders, RF radars, ultrasonic sensors, and infrared (IR) sensors) configured to collect data and provide measurements to processor 2110, whereby processor 2110 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 2140 may also include one or more Global Navigation Satellite System (GNSS) receivers or transceivers that are used to determine a location of the computing system 2100 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 2130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 2130 can include software services, servers, services, etc., that when the code that defines such software is executed by the processor 2110, it causes the system to perform a function. In some aspects, a hardware service that performs a particular function can include the software component stored in a computer-readable medium in connection with the necessary hardware components, such as processor 2110, connection 2105, output device 2135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for mitigating an operation misapplication of a vehicle, the apparatus comprising: at least one memory; and at least one processor coupled to the at least one memory configured to: determine an operation misapplication feature is applicable to a vehicle based on an operational design domain (ODD) context associated with the vehicle matching at least one of a plurality of predetermined ODDs; determine, based on a comparison of characteristics of a driver of the vehicle to a plurality of predetermined driver state patterns, the driver is not ready to engage in a driving task associated with the vehicle; determine the operation misapplication of the vehicle is a first type of operation misapplication; and actuate the vehicle to mitigate the operation misapplication based on determining the operation misapplication is the first type of operation misapplication.

Aspect 2. The apparatus of Aspect 1, wherein the at least one processor is configured to: determine a first classification of the operation misapplication of the vehicle based on sensor data associated with the vehicle; and determine, based on the first classification, the operation misapplication of the vehicle is the first type of operation misapplication.

Aspect 3. The apparatus of Aspect 2, wherein the at least one processor is configured to: determine a likelihood of the operation misapplication of the vehicle is one of greater than or equal to a threshold likelihood for the operation misapplication; and determine the first classification based on the likelihood of the operation misapplication of the vehicle being one of greater than or equal to the threshold likelihood for the operation misapplication.

Aspect 4. The apparatus of any one of Aspects 2 or 3, wherein the at least one processor is configured to: determine a second classification of the operation misapplication of the vehicle based on the sensor data associated with the vehicle; and determine, based on the second classification, an additional operation misapplication of the vehicle is a second type of operation misapplication.

Aspect 5. The apparatus of Aspect 4, wherein the at least one processor is configured to: determine a likelihood of the operation misapplication of the vehicle is one of less than or equal to a threshold likelihood for the operation misapplication; and determine the second classification based on the likelihood of the operation misapplication of the vehicle being one of less than or equal to the threshold likelihood for the operation misapplication.

Aspect 6. The apparatus of any one of Aspects 4 or 5, wherein the at least one processor is configured to: actuate, based on determining the operation misapplication is the first type of operation misapplication, the vehicle using a first type of actuation; and actuate, based on determining the operation misapplication is the second type of operation misapplication, the vehicle using a second type of actuation to mitigate the additional operation misapplication.

Aspect 7. The apparatus of any one of Aspects 4 to 6, wherein the at least one processor is configured to: output a warning to the driver based on determining the additional operation misapplication is the second type of operation misapplication.

Aspect 8. The apparatus of any one of Aspects 1 to 7, wherein the first type of operation misapplication is based on the operation misapplication feature being applicable to the vehicle, the driver not being ready to engage in the driving task, and a likelihood of the operation misapplication of the vehicle being one of greater than or equal to a threshold likelihood for the operation misapplication.

Aspect 9. The apparatus of Aspect 8, wherein the at least one processor is configured to: determine a second type of operation misapplication based on an additional operation misapplication feature being applicable to the vehicle, the driver not being ready to engage in the driving task, and a likelihood of the operation misapplication of the vehicle being one of less than or equal to the threshold likelihood for the operation misapplication.

Aspect 10. The apparatus of any one of Aspects 1 to 9, wherein the ODD context associated with the vehicle comprises at least one of attributes of an environment of the vehicle, one or more objects within the environment of the vehicle, or attributes of motion of the vehicle.

Aspect 11. The apparatus of any one of Aspects 1 to 10, wherein the operation misapplication of the vehicle is at least one of a pedal misapplication of the vehicle, a gear misapplication of the vehicle, or a steering misapplication of the vehicle.

Aspect 12. The apparatus of any one of Aspects 1 to 11, wherein, to actuate the vehicle to mitigate the operation misapplication, the at least one processor is configured to perform at least one of acceleration suppression, brake application, or drive control.

Aspect 13. The apparatus of any one of Aspects 1 to 12, wherein the at least one processor is configured to: determine the characteristics of the driver of the vehicle based on sensor data associated with the vehicle.

Aspect 14. The apparatus of Aspect 13, wherein the at least one processor is configured to determine the characteristics of the driver of the vehicle further based on driver profile information comprising at least one of a behavior pattern of the driver to drive the vehicle, a temper of the driver, one or more button presses, direct inputs from the driver, indirect inputs from the driver, or a gaze pattern of the driver.

Aspect 15. The apparatus of any one of Aspects 13 or 14, wherein the sensor data associated with the vehicle comprises at least one of traffic sensor data, vehicle sensor data from one or more sensors of the vehicle, map data, or sensor data from one or more messages.

Aspect 16. A method for mitigating an operation misapplication of a vehicle, the method comprising: determining an operation misapplication feature is applicable to a vehicle based on an operational design domain (ODD) context associated with the vehicle matching at least one of a plurality of predetermined ODDs; determining, based on a comparison of characteristics of a driver of the vehicle to a plurality of predetermined driver state patterns, the driver is not ready to engage in a driving task associated with the vehicle; determining the operation misapplication of the vehicle is a first type of operation misapplication; and actuating the vehicle to mitigate the operation misapplication based on determining the operation misapplication is the first type of operation misapplication.

Aspect 17. The method of Aspect 16, further comprising: determining a first classification of the operation misapplication of the vehicle based on sensor data associated with the vehicle; and determining, based on the first classification, the operation misapplication of the vehicle is the first type of operation misapplication.

Aspect 18. The method of Aspect 17, wherein determining the first classification is based on determining a likelihood of the operation misapplication of the vehicle is one of greater than or equal to a threshold likelihood for the operation misapplication.

Aspect 19. The method of any one of Aspects 17 or 18, further comprising: determining a second classification of the operation misapplication of the vehicle based on the sensor data associated with the vehicle; and determining, based on the second classification, an additional operation misapplication of the vehicle is a second type of operation misapplication.

Aspect 20. The method of Aspect 19, wherein determining the second classification is based on determining a likelihood of the operation misapplication of the vehicle is one of less than or equal to a threshold likelihood for the operation misapplication.

Aspect 21. The method of any one of Aspects 19 or 20, wherein the vehicle is actuated using a first type of actuation based on determining the operation misapplication is the first type of operation misapplication, and further comprising: actuating, based on determining the operation misapplication is the second type of operation misapplication, the vehicle using a second type of actuation to mitigate the additional operation misapplication.

Aspect 22. The method of any one of Aspects 19 to 21, further comprising: outputting a warning to the driver based on determining the additional operation misapplication is the second type of operation misapplication.

Aspect 23. The method of any one of Aspects 16 to 22, wherein the first type of operation misapplication is based on the operation misapplication feature being applicable to the vehicle, the driver not being ready to engage in the driving task, and a likelihood of the operation misapplication of the vehicle being one of greater than or equal to a threshold likelihood for the operation misapplication.

Aspect 24. The method of Aspect 23, further comprising: determining a second type of operation misapplication based on an additional operation misapplication feature being applicable to the vehicle, the driver not being ready to engage in the driving task, and a likelihood of the operation misapplication of the vehicle being one of less than or equal to the threshold likelihood for the operation misapplication.

Aspect 25. The method of any one of Aspects 16 to 24, wherein the ODD context associated with the vehicle comprises at least one of attributes of an environment of the vehicle, one or more objects within the environment of the vehicle, or attributes of motion of the vehicle.

Aspect 26. The method of any one of Aspects 16 to 25, wherein the operation misapplication of the vehicle is at least one of a pedal misapplication of the vehicle, a gear misapplication of the vehicle, or a steering misapplication of the vehicle.

Aspect 27. The method of any one of Aspects 16 to 26, wherein actuating the vehicle to mitigate the operation misapplication comprises at least one of acceleration suppression, brake application, or drive control.

Aspect 28. The method of any one of Aspects 16 to 27, further comprising: determining the characteristics of the driver of the vehicle based on sensor data associated with the vehicle.

Aspect 29. The method of Aspect 28, wherein determining the characteristics of the driver of the vehicle is further based on driver profile information comprising at least one of a behavior pattern of the driver to drive the vehicle, a temper of the driver, one or more button presses, direct inputs from the driver, indirect inputs from the driver, or a gaze pattern of the driver.

Aspect 30. The method of any one of Aspects 28 or 29, wherein the sensor data associated with the vehicle comprises at least one of traffic sensor data, vehicle sensor data from one or more sensors of the vehicle, map data, or sensor data from one or more messages.

Aspect 31. A non-transitory computer-readable medium having stored thereon instructions that, when executed by one or more processors, cause the one or more processors to perform operations according to any of Aspects 16 to 30.

Aspect 32. An apparatus comprising one or more means for performing operations according to any of Aspects 16 to 30.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for mitigating an operation misapplication of a vehicle, the apparatus comprising:
   at least one memory; and
   at least one processor coupled to the at least one memory, the processor configured to:
      determine an operation misapplication feature is applicable to a vehicle based on an operational design domain (ODD) context associated with the vehicle matching at least one of a plurality of predetermined ODDs;
      determine, based on a comparison of characteristics of a driver of the vehicle to a plurality of predetermined driver state patterns, a first state of the driver;
      identify, based on a comparison of the first state of the driver to a previously determined state of the driver, a threshold value;
      determine an operation misapplication of the vehicle is a first type of operation misapplication based on the first state of the driver and the threshold value; and
      actuate the vehicle to mitigate the operation misapplication based on determining the operation misapplication is the first type of operation misapplication.

2. The apparatus of claim 1, wherein the at least one processor is configured to:
   determine a first classification of the operation misapplication of the vehicle based on sensor data associated with the vehicle; and
   determine, based on the first classification, the operation misapplication of the vehicle is the first type of operation misapplication.

3. The apparatus of claim 2, wherein the at least one processor is configured to:
   determine a likelihood of the operation misapplication of the vehicle is one of greater than or equal to a threshold likelihood for the operation misapplication; and
   determine the first classification based on the likelihood of the operation misapplication of the vehicle being one of greater than or equal to the threshold likelihood for the operation misapplication.

4. The apparatus of claim 2, wherein the at least one processor is configured to:
   determine a second classification of an additional operation misapplication of the vehicle based on the sensor data associated with the vehicle; and
   determine, based on the second classification, the additional operation misapplication of the vehicle is a second type of operation misapplication.

5. The apparatus of claim 4, wherein the at least one processor is configured to:
   determine a likelihood of the additional operation misapplication of the vehicle is one of less than or equal to a threshold likelihood for the additional operation misapplication; and
   determine the second classification based on the likelihood of the additional operation misapplication of the vehicle being one of less than or equal to the threshold likelihood for the additional operation misapplication.

6. The apparatus of claim 4, wherein the at least one processor is configured to:
   actuate, based on determining the operation misapplication is the first type of operation misapplication, the vehicle using a first type of actuation; and
   actuate, based on determining the additional operation misapplication is the second type of operation misapplication, the vehicle using a second type of actuation to mitigate the additional operation misapplication.

7. The apparatus of claim 4, wherein the at least one processor is configured to:
   output a warning to the driver based on determining the additional operation misapplication is the second type of operation misapplication.

8. The apparatus of claim 1, wherein the first type of operation misapplication is based on the operation misapplication feature being applicable to the vehicle, the first state of the driver, the threshold value, and a likelihood of the operation misapplication of the vehicle being one of greater than or equal to a threshold likelihood for the operation misapplication.

9. The apparatus of claim 8, wherein the at least one processor is configured to:
   determine a second type of operation misapplication based on an additional operation misapplication feature being applicable to the vehicle, a second state of the driver, and a likelihood of the operation misapplication of the vehicle being one of less than or equal to the threshold likelihood for the operation misapplication.

10. The apparatus of claim 1, wherein the ODD context associated with the vehicle comprises at least one of attributes of an environment of the vehicle, one or more objects within the environment of the vehicle, or attributes of motion of the vehicle.

11. The apparatus of claim 1, wherein the operation misapplication of the vehicle is at least one of a pedal misapplication of the vehicle, a gear misapplication of the vehicle, or a steering misapplication of the vehicle.

12. The apparatus of claim 1, wherein, to actuate the vehicle to mitigate the operation misapplication, the at least one processor is configured to perform at least one of acceleration suppression, brake application, or drive control.

13. The apparatus of claim 1, wherein the at least one processor is configured to:

determine the characteristics of the driver of the vehicle based on sensor data associated with the vehicle.

14. The apparatus of claim 13, wherein the at least one processor is configured to determine the characteristics of the driver of the vehicle further based on driver profile information comprising at least one of a behavior pattern of the driver to drive the vehicle, a temper of the driver, one or more button presses, direct inputs from the driver, indirect inputs from the driver, or a gaze pattern of the driver.

15. The apparatus of claim 13, wherein the sensor data associated with the vehicle comprises at least one of traffic sensor data, vehicle sensor data from one or more sensors of the vehicle, map data, or sensor data from one or more messages.

16. A method for mitigating an operation misapplication of a vehicle, the method comprising:

determining an operation misapplication feature is applicable to a vehicle based on an operational design domain (ODD) context associated with the vehicle matching at least one of a plurality of predetermined ODDs;

determining, based on a comparison of characteristics of a driver of the vehicle to a plurality of predetermined driver state patterns, a first state of the driver;

identifying, based on a comparison of the first state of the driver to a previously determined state of the driver, a threshold value;

determining an operation misapplication of the vehicle is a first type of operation misapplication based on the first state of the driver and the threshold value; and actuating the vehicle to mitigate the operation misapplication based on determining the operation misapplication is the first type of operation misapplication.

17. The method of claim 16, further comprising:

determining a first classification of the operation misapplication of the vehicle based on sensor data associated with the vehicle; and determining, based on the first classification, the operation misapplication of the vehicle is the first type of operation misapplication.

18. The method of claim 17, wherein determining the first classification is based on determining a likelihood of the operation misapplication of the vehicle is one of greater than or equal to a threshold likelihood for the operation misapplication.

19. The method of claim 17, further comprising:

determining a second classification of an additional operation misapplication of the vehicle based on the sensor data associated with the vehicle; and determining, based on the second classification, the additional operation misapplication of the vehicle is a second type of operation misapplication.

20. The method of claim 19, wherein determining the second classification is based on determining a likelihood of the additional operation misapplication of the vehicle is one of less than or equal to a threshold likelihood for the additional operation misapplication.

* * * * *